United States Patent
Sengoku et al.

(10) Patent No.: US 9,921,981 B2
(45) Date of Patent: Mar. 20, 2018

(54) METHOD TO MINIMIZE THE NUMBER OF IRQ LINES FROM PERIPHERALS TO ONE WIRE

(71) Applicant: QUALCOMM Incorporated, San Diego, CA (US)

(72) Inventors: Shoichiro Sengoku, San Diego, CA (US); Richard Dominic Wietfeldt, San Diego, CA (US); George Alan Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 14/462,363

(22) Filed: Aug. 18, 2014

(65) Prior Publication Data
US 2015/0058507 A1    Feb. 26, 2015

Related U.S. Application Data

(60) Provisional application No. 61/869,673, filed on Aug. 24, 2013.

(51) Int. Cl.
*G06F 13/22* (2006.01)
*G06F 13/24* (2006.01)
(Continued)

(52) U.S. Cl.
CPC .............. *G06F 13/26* (2013.01); *G06F 13/22* (2013.01); *G06F 13/24* (2013.01);
(Continued)

(58) Field of Classification Search
CPC .......... G06F 13/20; G06F 13/22; G06F 13/24; G06F 13/36; G06F 13/362; G06F 13/366;
(Continued)

(56) References Cited

U.S. PATENT DOCUMENTS 4,586,040 A * 4/1986 Akiba ....................... H04Q 9/14
                                                                340/3.54
5,144,295 A * 9/1992 Nakagawa ............ H04L 12/403
                                                                340/12.13
(Continued)

FOREIGN PATENT DOCUMENTS

CN          1551004 A     12/2004
CN        102047235 A      5/2011
(Continued)

OTHER PUBLICATIONS

RepRap (Forum) [online]. Apr. 16-May 16, 2009 [retrieved Sep. 16, 2016]. Retrieved from the Internet. <http://forums.reprap.org/read.php?13,22861>.*

(Continued)

*Primary Examiner* — Thomas J Cleary
(74) *Attorney, Agent, or Firm* — Loza & Loza LLP

(57) ABSTRACT

A master device is provided which is coupled to a shared single line interrupt request (IRQ) bus and a control data bus. The master device group slave devices coupled to the shared single line IRQ bus into one or more groups, where each group is associated with a different IRQ signal. The master device then monitors the IRQ bus to ascertain when an IRQ signal is asserted by at least one slave device. The master device then identifies a group to with which the IRQ signal is associated. The slave devices for the identified group are then scanned or queried by the master device to ascertain which slave device asserted the IRQ signal on the IRQ bus. Each group uses a distinguishable IRQ signal to allow the master device to ascertain which group to query or scan.

30 Claims, 17 Drawing Sheets

(51) Int. Cl.
*G06F 13/26* (2006.01)
*G06F 13/42* (2006.01)

(52) U.S. Cl.
CPC .... *G06F 13/4226* (2013.01); *G06F 2211/001* (2013.01); *G06F 2211/002* (2013.01)

(58) Field of Classification Search
CPC ...... G06F 13/38; G06F 13/42; G06F 13/4282; G06F 13/26; G06F 2211/002; G06F 13/4226; G06F 2211/001
See application file for complete search history.

(56) References Cited

U.S. PATENT DOCUMENTS

| | | | |
|---|---|---|---|
| 5,321,818 A | | 6/1994 | Wendling et al. |
| 5,530,875 A | * | 6/1996 | Wach .................. G06F 13/26 710/264 |
| 5,555,420 A | | 9/1996 | Sarangdhar et al. |
| 5,943,500 A | * | 8/1999 | Maguire ............... G06F 9/4812 710/260 |
| 6,065,073 A | * | 5/2000 | Booth .................. G06F 13/24 370/908 |
| 6,263,395 B1 | * | 7/2001 | Ferguson ............... G06F 13/24 710/262 |
| 6,704,823 B1 | * | 3/2004 | Perez .................. G06F 13/24 710/260 |
| 7,089,338 B1 | * | 8/2006 | Wooten ................ G06F 13/24 710/110 |
| 7,200,700 B2 | | 4/2007 | Chen |
| 8,099,469 B2 | | 1/2012 | Furtner et al. |
| 2002/0116563 A1 | * | 8/2002 | Lever .................. G06F 13/26 710/260 |
| 2004/0098523 A1 | * | 5/2004 | Beer ................... G06F 3/0607 710/74 |
| 2009/0248932 A1 | * | 10/2009 | Taylor .................. G06F 13/24 710/110 |
| 2011/0113171 A1 | * | 5/2011 | Radhakrishnan ... G06F 13/4291 710/110 |
| 2012/0144078 A1 | | 6/2012 | Poulsen |
| 2013/0179609 A1 | * | 7/2013 | Bhesania ............... G06F 13/28 710/62 |
| 2015/0074305 A1 | * | 3/2015 | Sengoku ............. G06F 11/3027 710/110 |
| 2015/0095537 A1 | * | 4/2015 | Sengoku ............. G06F 13/4295 710/110 |
| 2015/0100712 A1 | * | 4/2015 | Sengoku ................ G06F 13/28 710/110 |
| 2015/0100713 A1 | * | 4/2015 | Sengoku ............. G06F 13/4291 710/110 |
| 2015/0199287 A1 | * | 7/2015 | Sengoku ................ G06F 13/24 710/110 |
| 2015/0199295 A1 | * | 7/2015 | Sengoku ............... G06F 13/364 710/110 |
| 2016/0147684 A1 | * | 5/2016 | Sengoku ................ G06F 13/24 710/105 |
| 2016/0217090 A1 | * | 7/2016 | Sengoku ............... G06F 13/364 |

FOREIGN PATENT DOCUMENTS

| | | |
|---|---|---|
| EP | 1160675 A2 | 12/2001 |
| WO | WO-9855936 A1 | 12/1998 |

OTHER PUBLICATIONS

"Group". Dictionary.com Unabridged. Random House, Inc. [retrieved Sep. 16, 2016]. Retrieved from the Internet. <Dictionary.com http://www.dictionary.com/browse/group?s=t>.*
International Search Report and Written Opinion—PCT/US2014/051758—ISA/EPO—dated Oct. 7, 2014.

* cited by examiner

METHOD TO MINIMIZE THE NUMBER OF IRQ LINES FROM PERIPHERALS TO ONE WIRE

CROSS-REFERENCE TO RELATED APPLICATIONS

The present Application for Patent claims priority to Provisional Application No. App. No. 61/869,673, entitled "Method To Minimize The Number Of IRQ Lines From Peripherals To One Wire" filed Aug. 24, 2013, which is assigned to the assignee hereof and hereby expressly incorporated by reference herein.

TECHNICAL FIELD

The present disclosure pertains to reducing the need for separate interrupt request lines for each slave device by using a single shared interrupt request line for all slave devices.

BACKGROUND

The Inter-Integrated Circuit serial bus, which may also be referred to as the I2C bus or the I²C bus, is a serial single-ended computer bus that was intended for use in connecting low-speed peripherals to a processor. The I2C bus is a multi-master bus in which each device can serve as a master and a slave for different messages transmitted on the I2C bus. The I2C bus can transmit data using only two bidirectional open-drain connectors, including a Serial Data Line (SDA) and a Serial Clock Line (SCL). The connectors typically include signal wires that are terminated by pull-up resistors.

Protocols governing I2C bus operations define basic types of messages, each of which begins with a START and ends with a STOP. The I2C bus uses 7-bit addressing and defines two types of nodes. A master node is a node that generates the clock and initiates communication with slave nodes. A slave node is a node that receives the clock and responds when addressed by the master. The I2C bus is a multi-master bus, which means any number of master nodes can be present. Additionally, master and slave roles may be changed between messages (i.e., after a STOP is sent).

Traditional I2C systems use separate interrupt request (IRQ) lines for each slave device, which increases master device cost due to the large number of pins. These IRQ lines allow a slave device to request the attention of a master device and/or to indicate to the master device when it wishes to communicate over a data bus.

Therefore, a way is needed to reduce the number or IRQ lines coming into a master device from a plurality of slave devices.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In various aspects, a method operational on a master device includes grouping one or more slave devices coupled to a shared single line IRQ bus into one or more groups, monitoring the IRQ bus to ascertain when an IRQ signal is asserted by one of the slave devices, identifying a group with which the IRQ signal is associated, and scanning the slave devices of the identified group to ascertain an asserting slave device that asserted the IRQ signal on the IRQ bus. Each group may be associated with a different IRQ signal. Each group includes at least one slave device.

In an aspect, scanning the slave devices includes scanning an IRQ status register of the asserting slave device. The asserting slave device may be granted access to transmit data over the control data bus.

In an aspect, the IRQ signal associated with each group has a different pulse width than the IRQ signals associated with the other groups.

In an aspect, the IRQ bus operates asynchronously. The IRQ bus may be dedicated to unidirectional signal transmissions from the slave devices to the master device. The control data bus may support bidirectional signaling between the slave devices and the master device.

In various aspects, a master device includes a first interface to a single line IRQ bus to which one or more slave devices are coupled, a second interface to a control data bus to which the one or more slave devices are also coupled, and a processing circuit coupled to the first interface and the second interface. The processing circuit may be adapted or configured to group the one or more slave devices into one or more groups, where each group is associated with a different IRQ signal. The processing circuit may be adapted or configured to monitor the IRQ bus to ascertain when an IRQ signal is asserted by at least one slave device. The processing circuit may be adapted or configured to identify a group to with which the IRQ signal is associated. The processing circuit may be adapted or configured to scan the slave devices for the identified group to identify an asserting slave device that asserted the IRQ signal on the IRQ bus.

In various aspects a computer-readable storage medium includes code for grouping one or more slave devices coupled to a shared single line IRQ bus into one or more groups, monitoring the IRQ bus to ascertain when an IRQ signal is asserted by one of the slave devices, identifying a group with which the IRQ signal is associated, and scanning the slave devices of the identified group to ascertain an asserting slave device that asserted the IRQ signal on the IRQ bus. Each group may be associated with a different IRQ signal. Each group includes at least one slave device.

In various aspects, a method operational on a slave device includes obtaining a group assignment from a master device, monitoring an IRQ bus to ascertain whether an IRQ signal is asserted by another slave device, and asserting a first IRQ signal on the IRQ bus when no other IRQ signal is asserted on the IRQ bus. The group assignment may identify one group from a plurality of groups. Each group may be associated with a different IRQ signal. Each group includes at least one slave device.

In an aspect, the method includes deasserting the first IRQ signal from the IRQ bus, monitoring the IRQ bus to ascertain whether another device is asserting a second IRQ signal on the IRQ bus. If the second IRQ signal is being asserted, the first IRQ signal may be reasserted after the second IRQ signal is deasserted and/or the IRQ bus becomes idle.

In an aspect, the method includes receiving a status register query from the master device via a control data bus, and responding with a status indication that the slave device asserted the IRQ signal on the IRQ bus.

In an aspect, the IRQ bus operates as an asynchronous bus. The IRQ bus may be dedicated to unidirectional signal transmissions from slave devices to the master device. The control data bus may be a bus compatible with a camera control interface. The control data bus may be a bidirectional bus that is deployed between the slave devices and the master device.

In various aspects, a slave device, includes a first interface to a single line IRQ bus to which a master device is coupled, a second interface to control data bus to which the master device is also coupled, and a processing circuit coupled to the first interface and the second interface. The processing circuit may be adapted or configured to obtain a group assignment from a master device, monitor the IRQ bus to ascertain whether an IRQ signal is asserted by another slave device, and assert an IRQ signal on the IRQ bus when no other IRQ signal is asserted on the IRQ bus. The group assignment may identify one group from a plurality of groups. Each group may be associated with a different IRQ signal.

In various aspects a computer-readable storage medium includes code for obtaining a group assignment from a master device, monitoring an IRQ bus to ascertain whether an IRQ signal is asserted by another slave device, and asserting a first IRQ signal on the IRQ bus when no other IRQ signal is asserted on the IRQ bus. The group assignment may identify one group from a plurality of groups. Each group may be associated with a different IRQ signal. Each group includes at least one slave device.

BRIEF DESCRIPTION OF THE DRAWINGS

Various features, nature and advantages may become apparent from the detailed description set forth below when taken in conjunction with the drawings in which like reference characters identify correspondingly throughout.

DETAILED DESCRIPTION

Figure 1:
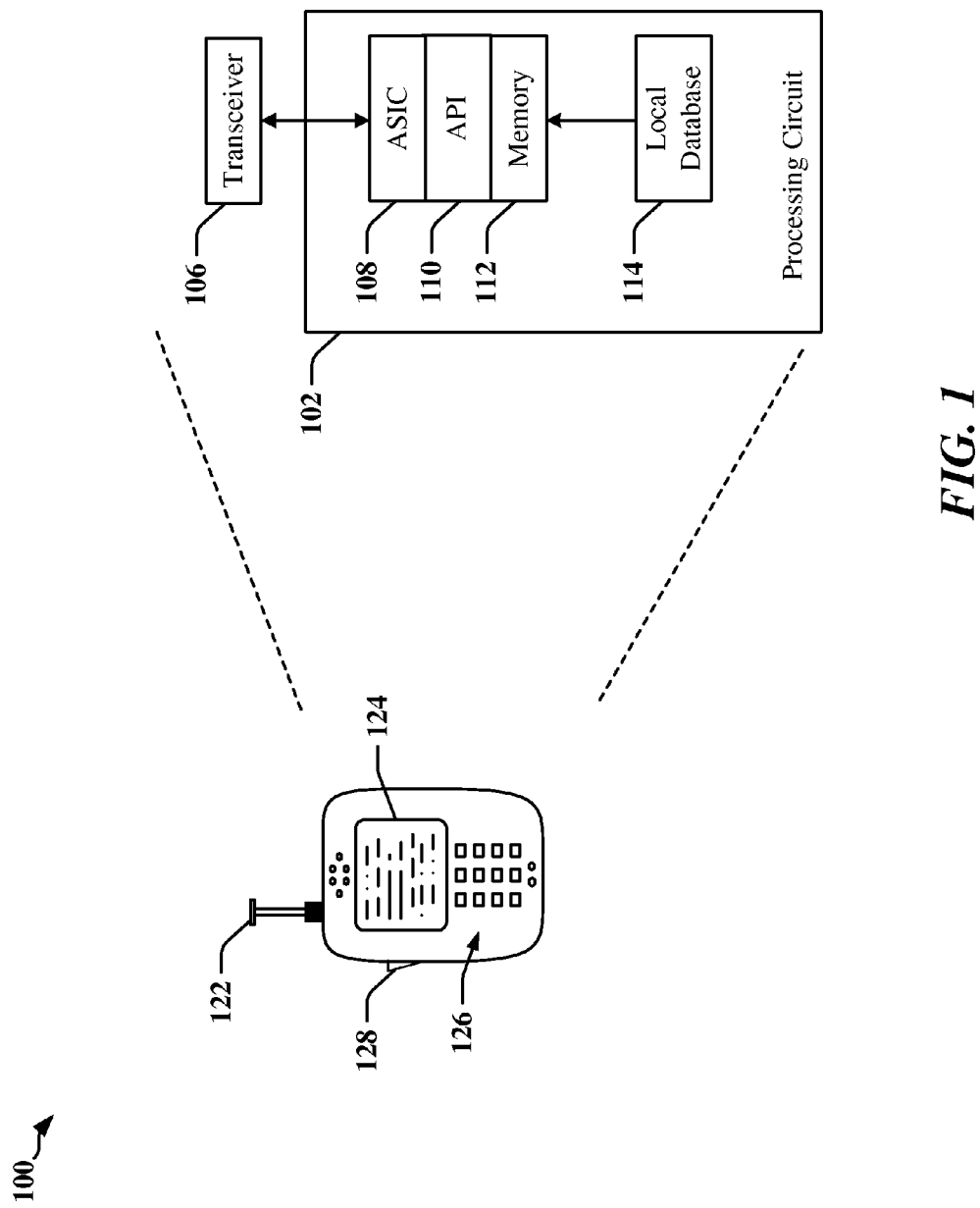
FIG. 1 depicts an apparatus employing a data link between integrated circuit devices that selectively operates according to one of plurality of available standards

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may not be shown in detail in order not to obscure the embodiments.

Certain embodiments disclosed herein provide systems, methods and apparatus that can improve the performance of a communications interface using a serial bus that supports both conventional I2C bus operations and enhanced communications interfaces using a common I2C bus. In one example, a camera control interface (CCI) may be based on an I2C bus and may be deployed using a two-wire, bi-directional, half duplex, serial interface configured as a bus connecting a master and one or more slaves. CCI operations may be compatible with I2C bus operations. According to certain aspects, systems, apparatus and methods are provided that minimize the number of IRQ lines needed to support multiple peripheral devices connected to an I2C or CCI bus. In some instances, a single IRQ line can handle interrupt requests from all of the peripherals connected to the I2C or CCI bus. In one example disclosed herein, CCI extension (CCIe) devices may be deployed using the I2C bus to provide a two-wire, bi-directional, half-duplex, serial interface that can operate at data rates that are significantly greater than the data rates obtained using I2C or CCI modes of operation. In this latter example, a single IRQ line can handle interrupt requests from I2C, CCI, or CCIe peripherals connected to the bus.

Overview

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Certain aspects of the invention may be applicable to communications links deployed between electronic devices that may include subcomponents of an apparatus such as a telephone, a mobile computing device, an appliance, automobile electronics, avionics systems, etc. FIG. 1 depicts an apparatus that may employ a communication link between integrated circuit (IC) devices. In one example, the apparatus 100 may include a wireless communication device that communicates through an RF transceiver with a radio access network (RAN), a core access network, the Internet and/or another network. The apparatus 100 may include a communications transceiver 106 operably coupled to processing circuit 102. The processing circuit 102 may have one or more IC devices, such as an application-specific IC (ASIC) 108. The ASIC 108 may include one or more processing devices, logic circuits, and so on. The processing circuit 102 may include and/or be coupled to processor readable storage such as a memory 112 that may maintain instructions and data that may be executed by processing circuit 102. The processing circuit 102 may be controlled by one or more of an operating system and an application programming interface (API) 110 layer that supports and enables execution of software modules residing in storage media, such as the memory device 112 of the wireless device. The memory device 112 may include read-only memory (ROM) or random-access memory (RAM), electrically erasable programmable ROM (EEPROM), flash cards, or any memory device that can be used in processing systems and computing platforms. The processing circuit 102 may include or access a local database 114 that can maintain operational parameters and other information used to configure and operate apparatus 100. The local database 114 may be implemented using one or more of a database module, flash memory, magnetic media, EEPROM, optical media, tape, soft or hard disk, or the like. The processing circuit may also be operably coupled to external devices such as an antenna 122, a display 124, operator controls, such as a button 128 and/or a keypad 126, among other components.

A First Example illustrating a Method for Reducing IRQ Lines

Figure 2:
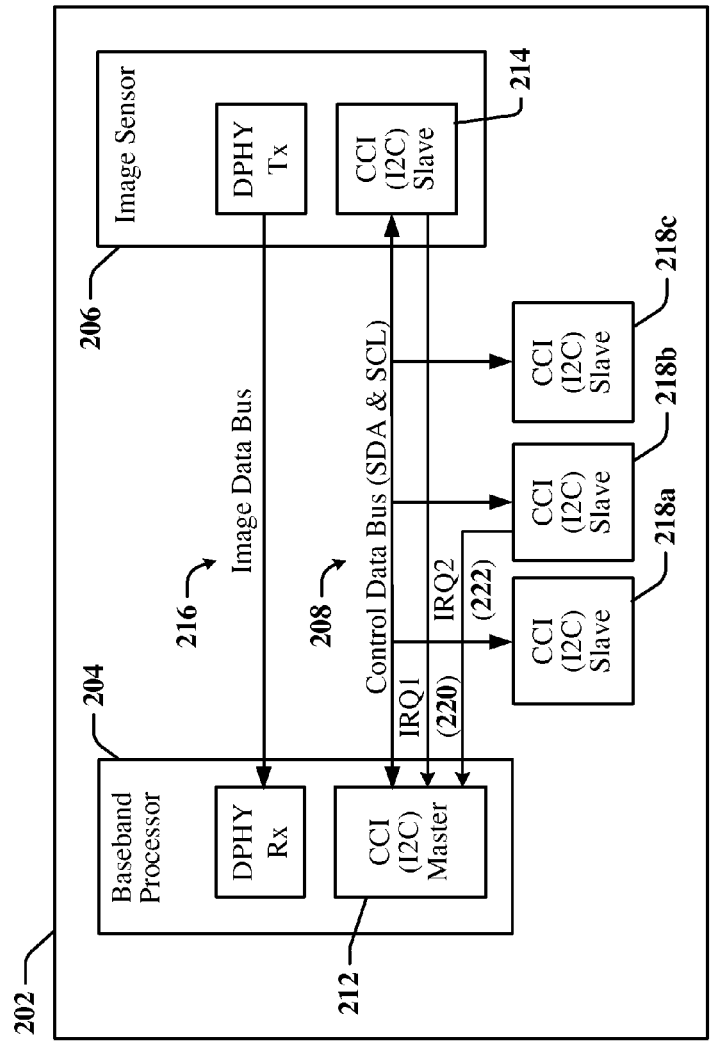
FIG. 2 is a block diagram illustrating a device having a baseband processor and an image sensor and implementing an image data bus and a control data bus.

FIG. 2 is a block diagram 200 illustrating a simplified example of a device 202 that has a baseband processor 204 and an image sensor 206. An image data bus 216 and a multi-mode control data bus 208 may be implemented in the device 202. The diagram 200 illustrates a camera device 202 by way of example only, and various other devices and/or different functionalities may implement, operate and/or communicate using the control data bus 208. In the depicted example, image data may be sent from the image sensor 206 to the baseband processor 204 over an image data bus 216, such as the "DPHY" high-speed differential link defined by MIPI. In one example, the control data bus 208 may have two wires that are configurable for operation in an I2C bus mode. Accordingly, the control data bus 208 may include SCL and SDA wires. The SCL may carry a clock signal that may be used to synchronize data transfers over the control data bus 208 according to I2C protocols. The data line SDA and clock line SCL may be coupled to multiple devices 212, 214, and 218 on the I2C bus (control data bus 208). In the example, control data may be exchanged between the baseband processor 204 and the image sensor 206 as well as other peripheral devices 218 via the control data bus 208. According to I2C protocols, clock speeds on the SCL wire may be up to 100 KHz for normal I2C operation, up to 400 KHz for I2C fast mode, and up to 1 MHz for I2C fast mode plus (Fm+). These operating modes over an I2C bus may be referred to as a CCI mode when used for camera applications.

In some instances, two or more slave devices 214, or 218a may request attention of the baseband processor 204 by asserting a predefined logic level on a corresponding IRQ line 220, or 222.

Example Illustrating Certain Aspects of a Device Adapted for CCIe Operations

Figure 3:
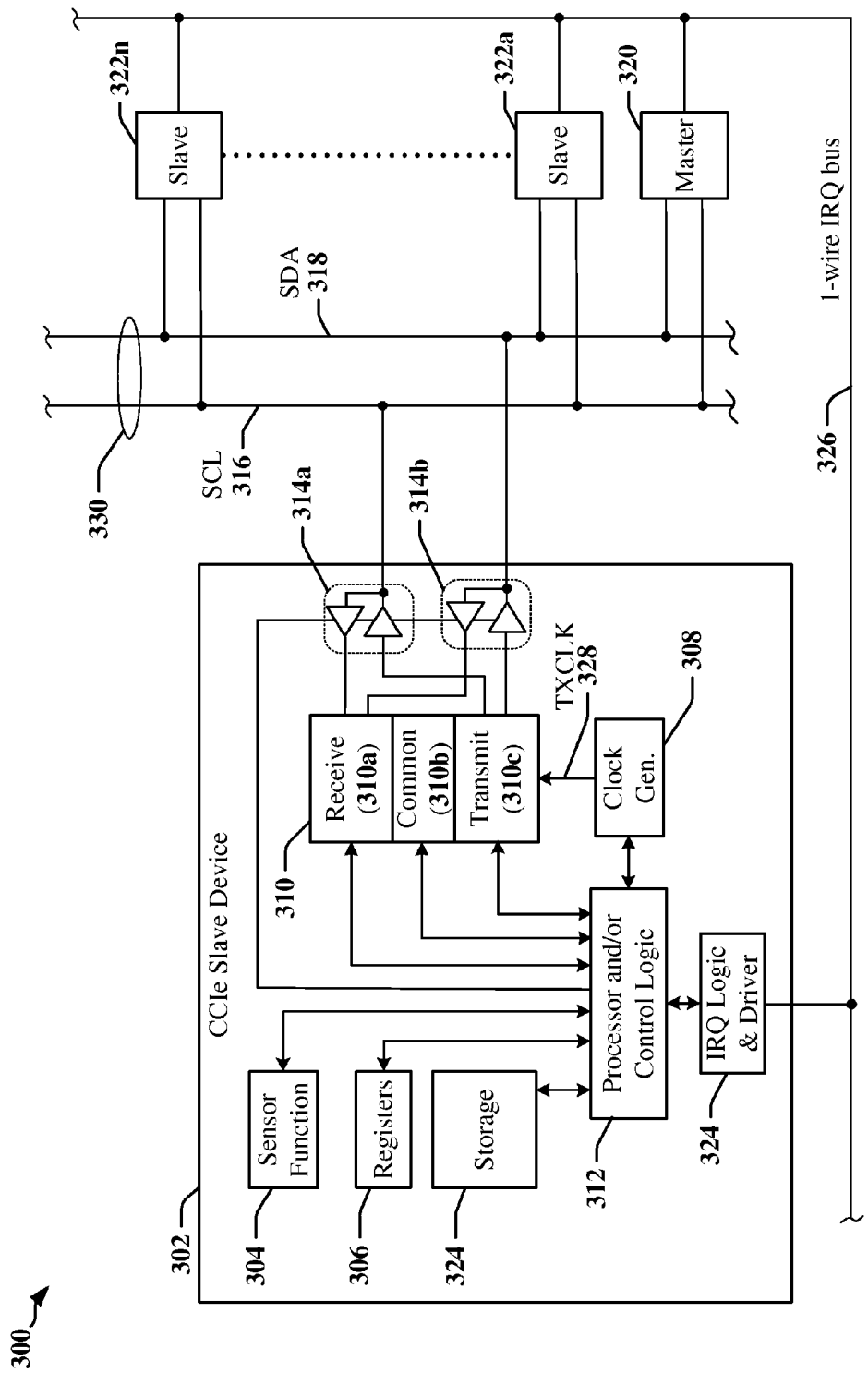
FIG. 3 is a diagram that illustrates a simplified system architecture for an apparatus employing a data link between IC devices according to certain aspects disclosed herein.

FIG. 3 is a block schematic diagram illustrating certain aspects of an apparatus 300 that may employ a communications bus such as a CCIe bus 330. The apparatus 300 may be embodied in one or more of a wireless mobile device, a mobile telephone, a mobile computing system, a wireless telephone, a notebook computer, a tablet computing device, a media player, a gaming device, or the like. The apparatus 300 may include multiple devices 302, 320, and/or 322a-322n, which communicate using a CCIe bus 330. The CCIe bus 330 can extend the capabilities of a conventional CCI bus for devices that are configured for enhanced features supported by the CCIe bus 330. For example, the CCIe bus 330 may support a higher bit rate than a CCI bus 330. According to certain aspects disclosed herein, some versions of the CCIe bus 330 may be configured or adapted to support bit rates of 16.7 Mbps or more, and some versions of the CCIe bus may be configured or adapted to support data rates of at least 23 megabits per second.

In the example illustrated in FIG. 3, an imaging device 302 is configured to operate as a slave device on the CCIe bus 330. The imaging device 302 may be adapted to provide a sensor control function 304 that manages an image sensor, for example. In addition, the imaging device 302 may include configuration registers 306 and/or other storage devices 324, a processing circuit and/or control logic 312, a transceiver 310 and line drivers/receivers 314a and 314b. The processing circuit and/or control logic 312 may include a processor such as a state machine, sequencer, signal processor or general-purpose processor. The transceiver 310 may include a receiver 310a, a transmitter 310c and certain common circuits 310b, including timing, logic and storage circuits and/or devices. In some instances, the transceiver 310 may include encoders and decoders, clock and data recovery circuits, and the like.

A transmit clock (TXCLK) signal 328 may be provided to the transmitter 310c, where the TXCLK signal 328 can be used to determine data transmission rates for a CCIe communication mode. The TXCLK signal 328 may be embedded within sequences of symbols transmitted on the CCIe bus 330, when both the SDA wire 318 and the SCL wire 316 are used to encode transmitted data. In one example, the TXCLK signal 328 may be embedded using transition clock transcoding, whereby data to be transmitted over the physical link 330 is transcoded such that a change of state of at least one wire 316 and/or 318 occurs between each pair of consecutive symbols transmitted on the CCIe bus 330.

In one example disclosed herein, CCIe devices 302, 320, and/or 322a-322n may be coupled to an IRQ bus 326 having a single wire. The CCIe devices 302, 320, and/or 322a-322n may communicate using the two-wires 316, 318 of a control data bus 330. For example, the two-wire control data bus 330 may support CCIe bi-directional, half-duplex modes of communication that can provide significantly greater data rates than the data rates supported by I2C or CCI modes of operation. The CCIe devices 302, 320, and/or 322a-322n may transmit data on both the SCL wire 316 and the SDA wire 318 of the control data bus 330, with clock information embedded in a sequence of symbols transmitted on the two-wire control data bus 330. Certain CCIe devices 320 may be configured as a bus master, and certain devices 302, and/or 322a-322n may be configured as slave devices. The CCIe devices 302, 320, and/or 322a-322n may be compatible with, or coexist with I2C and/or CCI devices coupled to the control data bus 330, such that a CCIe device 302, 320, or 322a-322n may communicate with one or more other CCIe devices 302, 320, and/or 322a-322n using CCIe protocols and signaling specifications, even when I2C devices are monitoring the control data bus 330. One example disclosed herein provides an interface that can handle multiple slaves 302, and/or 322a-322n coupled to the bus, with a single master device 320, when both CCIe and I2C/CCI devices are deployed on the same bus. In the latter example, two or more CCIe devices 302, 320, and/or 322a-322n may communicate using CCIe protocols, and any communication transaction with an I2C or CCI device is conducted in accordance with I2C bus protocols.

Example Illustrating the Use of a Common IRQ Bus

Figure 4:
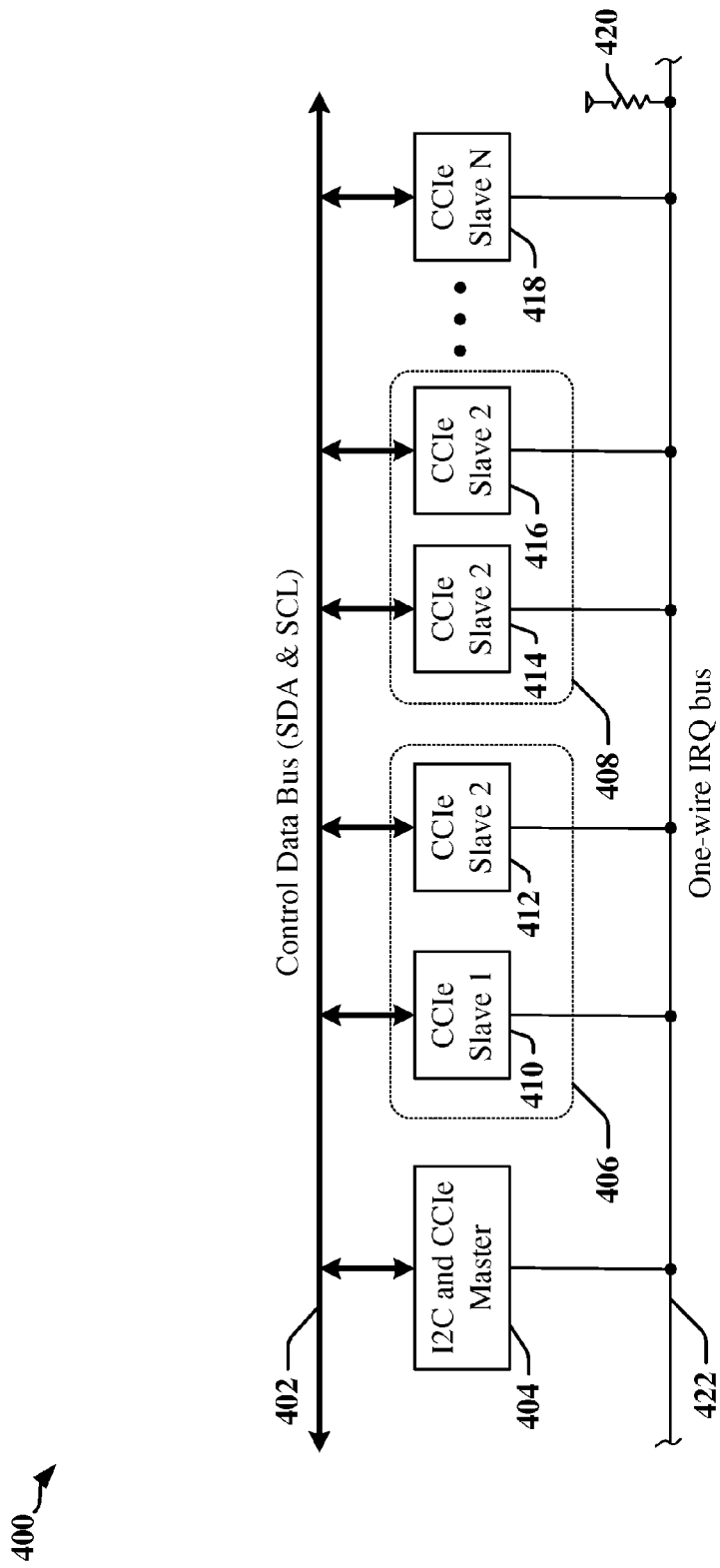
FIG. 4 is a block diagram illustrating how a single wire IRQ bus may be shared by a plurality of slave devices and one or more master devices according to certain aspects disclosed herein.

FIG. 4 is a block diagram 400 illustrating an example in which one or more slave devices 410, 412, 414, 418, 418 may request attention of a bus master 404 by asserting a predefined logic level on a common or shared single-line IRQ bus 422. A single-wire IRQ bus 420 may be shared by a plurality of slave devices 410, 412, 414, 416, 418, which may include I2C, CCI and/or CCIe devices. In the depicted example, each of the slave devices 410, 412, 414, 416, 418 may be adapted to support CCIe modes of communication, and the bus master device 404 is adapted to serve as a bus master in I2C, CCI and CCIe modes of operation.

According to one aspect, a shared single-line IRQ bus 422 is coupled to the slave devices 410, 412, 414, 416, 418 to the master device 404. A pull-up resistance 420 may be coupled to the wire of the IRQ bus 422 in order to define the signaling state of the IRQ bus 422 when none of the slave devices 410, 412, 414, 416, 418 are asserting an interrupt request. In one example, the slave devices 410, 412, 414, 416, 418 may drive the IRQ bus 422 low to interrupt or request an interrupt of the master device 404. That is, each slave device 410, 412, 414, 416, and 418 may independently assert an interrupt request by driving the IRQ signal in order to request attention from the master device 404.

The common, shared single-wire IRQ bus 422 may be shared by a plurality of slave devices 410, 412, 414, 416, 418 by configuring each of the slave devices 410, 412, 414, 416, 418 to provide an indication of the identity of one or more slave devices 410, 412, 414, 416, and/or 418 that have asserted an interrupt request. In some instances, two or more of the slave devices 410, 412, 414, 416, 418 may contend for the attention of the master device 404, and the indication of the identity of these contending slave devices 410, 412, 414, 416, and/or 418 may be used to determine which request for attention from the master device 404 is to be granted. In one example, each slave device 410, 412, 414, 416, 418 may be configured to assert an interrupt request by driving the IRQ bus 422 for period of time that has a length corresponding to the identity of the device 410, 412, 414, 416, or 418 driving the IRQ bus 422. In some instances, the length of a pulse used to drive the IRQ bus 422 may identify a group 406, 408 of the slave devices 410, 412, 414, 416, 418 that includes a slave device 410, 412, 414, 416, 418 that is contending for the attention from the master device 404. Each slave device 410, 412, 414, 416, or 418 may be configured to generate a pulse having a width defined and/or assigned to a group 406, 408 to which the slave device 410, 412, 414, 416, or 418 belongs. For example, the slave devices 410 and 412 in a first group 406 may be configured to generate a pulse on the shared single-wire IRQ bus 422 that has a different duration than the duration of a pulse generated by the slave devices 414 and 416 in a second group 408. Each group 406 and 408 includes at least one slave device.

The duration of an assertion of the IRQ bus 422 may determine if a requesting slave device 410, 412, 414, 416, or 418 is granted the attention of the master device 404. In one example, a prioritization scheme may assign longer pulse widths to higher priority slave devices 410, 412, 414, 416, 418 and shorter pulse widths to lower priority slave devices 410, 412, 414, 416, 418. In operation, a first slave device 410, 412, 414, 416, or 418 may assert an interrupt request by providing a pulse on the IRQ bus 422. A second, higher-priority slave device 410, 412, 414, 416, or 418 may assert an interrupt request by providing a pulse on the IRQ bus 422 that has a longer width than the width of the pulse provided by the first slave device 410, 412, 414, 416, or 418. When the IRQ bus 422 has been asserted, the master device 404 may use the duration of the assertion of the IRQ bus 422 to identify the highest-priority group 406 or 408 that includes an asserting slave device 410, 412, 414, 416, and/or the highest-priority slave device 410, 412, 414, 416, or 418 that is asserting the IRQ bus 422. The master device may then use signaling on the control data bus 402 to scan an IRQ status register on one or more slave devices 410, 412, 414, 416, 418 that is assigned the pulse width that was observed on the IRQ bus 422.

In some instances, a first slave device 410, 412, 414, 416, or 418 may yield to a second slave device 410, 412, 414, 416, or 418 when the IRQ bus 422 continues to be actively driven after termination of the pulse provided by the first slave device 410, 412, 414, 416, or 418, indicating that at least the second, higher-priority slave device 410, 412, 414, 416, or 418 is also requesting the attention of the master device 404 by driving the IRQ bus 422 with a longer pulse width. In such circumstances, the first slave device 410, 412, 414, 416, or 418 may revert to an idle or dormant mode until a next opportunity to contend for the control data bus 402 arises.

In some instances, the single wire IRQ bus 422 may be shared by slave devices 410, 412, 414, 416, 418 and one or more master devices 404. In this example, the slave devices 410, 412, 414, 416, 418 may be logically grouped. For example, a first group 406 may include a first plurality of slave devices 410, and 412, and a second group 408 may include a second plurality of slave devices 414, and 416. Such groupings may be, for example, pre-configured, dynamically defined and/or defined by enumeration by the master device 404 at initialization. The use of groups 406, 408 may permit the master device 404 to more quickly identify one or more slave devices 410, 412, 414, 416, and/or 418 that assert an interrupt request by driving the IRQ bus 422.

In some instances, the single-line IRQ bus may operate asynchronously, without management of a master device 404 or another device. In asynchronous operation, a slave device 410, 412, 414, 416, or 418 may unilaterally drive the IRQ bus 422 at any time. In some instances, the slave devices 410, 412, 414, 416, 418 may confirm that IRQ bus 422 is idle (i.e. not driven by another device) prior to asserting an interrupt request.

In some instances, the single-line IRQ bus 422 may be dedicated to unidirectional signal transmissions from slave devices 410, 412, 414, 416, 418 to the master device 404. That is, the IRQ bus 422 may be reserved for interrupt request signaling and other types of signals are not supported on the IRQ bus 422.

Groups 406, 408 of slave devices 410, 412, 414, 416 may be configured to use a distinct IRQ signal. In one example, a first group 406 may use a first signal having a first period, a second group 408 may use a second signal having a second period, and so on. In some instances, a slave device 418 that is not grouped with another slave device may be treated as a group of one device, and may be assigned to use a third signal having a third period. The period of an IRQ signal may be defined as the length of time for which the IRQ bus 420 is driven (e.g. pulled low) by the asserting slave device 410, 412, 414, 416, or 418. Other forms of signal differentiation may be used. For example, different IRQ signal voltage levels may be assigned to different groups 406, 408 of slave devices 410, 412, 414, 416, and/or a slave device 418 that is unassigned to a group or otherwise treated as the sole member of a group.

In some instances, a group 406, 408 may define a logical group of slave devices 410, 412, 414, 416, 418, such that each group 406, 408 may include at least one slave device 410, 412, 414, 416, 418. A group 406, 408 may include multiple slave devices 410, 412, 414, 416, 418. The number of slave devices 410, 412, 414, 416, 418 assigned to each group 406, 408 may be determined based on factors such as the duration of time to query and identify each potential asserting slave device 410, 412, 414, 416, 418 in the group 406, 408. For instance, an unacceptably long delay may result when all slave devices 410, 412, 414, 416, 418 coupled to the IRQ bus 422 are queried by the master device 404.

The time to identify an asserting slave device 410, 412, 414, 416, 418 may be substantially reduced through the use of distinct IRQ signals to identify a group 406, 408 in which a slave device 410, 412, 414, 416, 418 has asserted an IRQ, and then querying each member slave device 410, 412, 414, 416, 418 in the identified group 406, or 408. The master device 404 may detect the occurrence of an assertion of the IRQ bus 422, and the master device 404 may determine the duration of the assertion. Based on the determined duration of the IRQ assertion, the master device 404 may identify a group 406 or 408 corresponding to a duration of the length observed by the master device 404. The master device 404 may then query each slave device 410, 412, 414, 416, 418 in the group 406, 408 to identify which slave device triggered or asserted the IRQ signal. In one example, the master device 404 may determine that an IRQ assertion originated from a first group 406. The master device 404 may transmit a request or command over the control data bus 402 to a first slave device 410, or 412. The master device 404 may transmit a register status request, for example. In response, the first slave device 410, or 412 may transmit status information to the master device 404. If the status information indicates that the first slave device 410, or 412 is not the source of the IRQ request, the master device 404 may transmit a register status request over the control data bus 402 to a second slave device 412, or 410 in the first group 406. This process may be repeated for all slave devices 410, 412 the first group 406 until a slave device 410, 412 that asserted the IRQ signal is identified.

Figure 5:
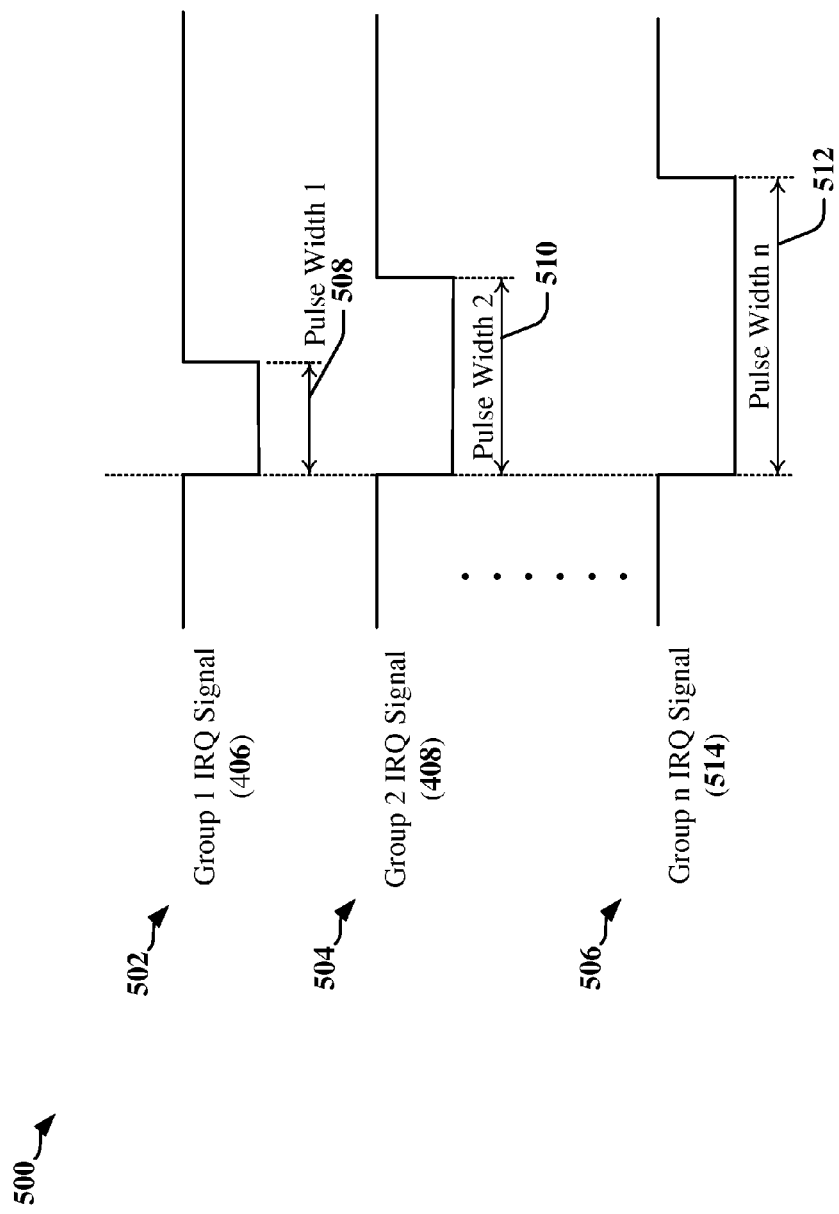
FIG. 5 illustrates examples of different IRQ signals that may be assigned or associated with different groups according to certain aspects disclosed herein.

FIG. 5 is a timing diagram 500 illustrating examples of timing of IRQ signals 502, 504, 506, used by different groups 406, 408, 514, respectively. Different IRQ signal timing may be assigned or associated with each different group 406, 408, 514, and/or the IRQ signal timing of the member slave devices 410, 412, 414, 416, 418 of each group 406, 408, or 514 may be based on, or derived from the IRQ signal timing assigned or associated with the corresponding group 406, 408, 514. Each group 406, 408, 514 may include a single one of the member slave devices 410, 412, 414, 416, 418 or a plurality of the member slave devices 410, 412, 414, 416, 418. A first group 406 may use an IRQ signal 502 having a first pulse width 508, a second group 408 may use an IRQ signal 504 having a second pulse width 510, and an nth group 506 may be configured to use a third IRQ signal 506 having a third pulse width 512.

Figure 6:
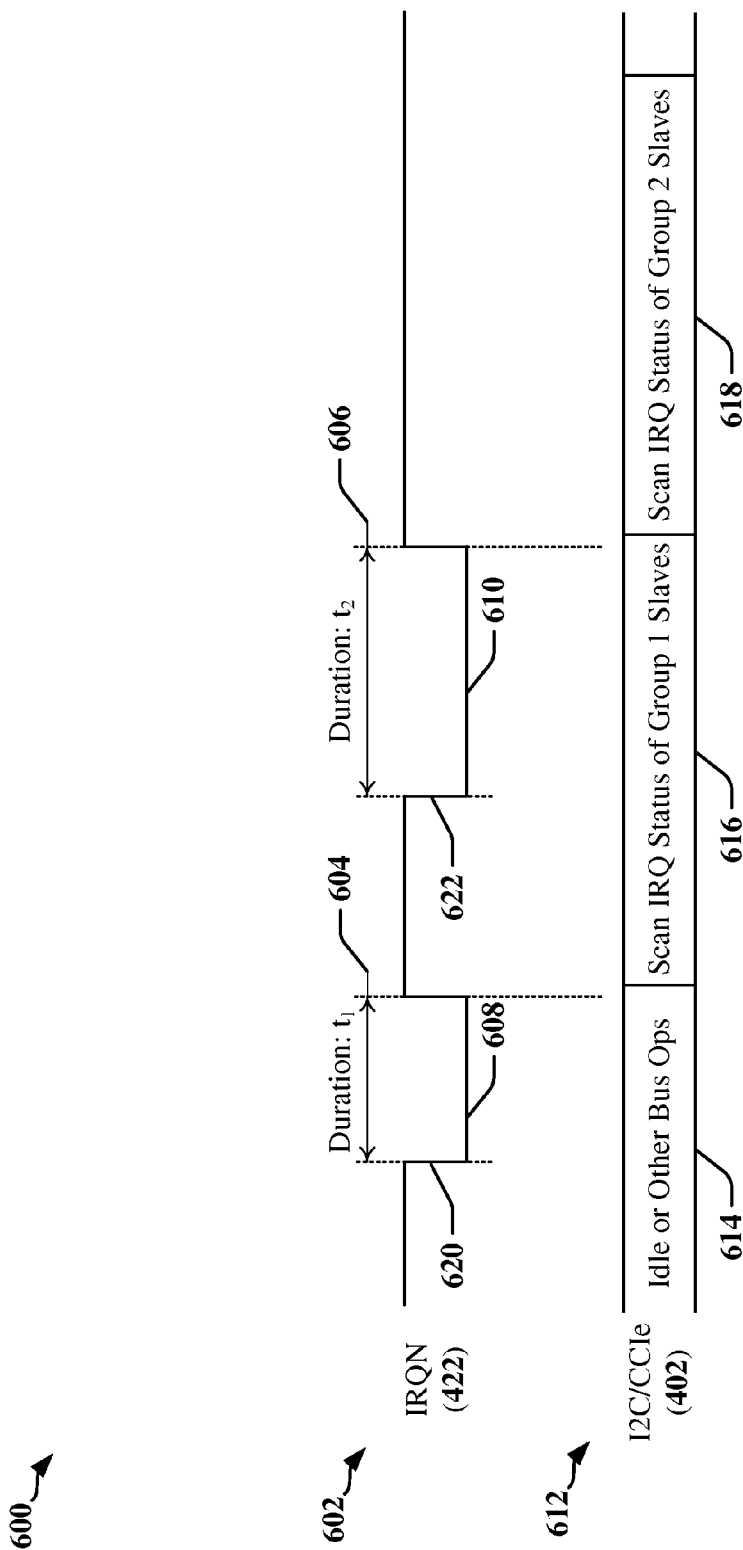
FIG. 6 illustrates monitoring for IRQ signals and identification of an IRQ-asserting slave device by a master device according to certain aspects disclosed herein.

FIG. 6 illustrates the operation of a shared IRQ bus 422 from the perspective of a bus master device 404. The example may apply to timing 612 of operations on a control data bus 402 that is operated in accordance with I2C, CCI and/or CCIe protocols. The bus master device 404 may monitor the timing 602 of signals on the IRQ bus 422 to determine whether an interrupt request has been asserted. The bus master device 404 may identify the slave device asserting the interrupt request based on the duration 604, 606 of a pulse 608, 610 on the IRQ bus 422.

In the example, groups 406, 408 of slave devices may be configured to drive the IRQ bus 422 for predefined periods of time 604, 606. Accordingly, the bus master device 404 may monitor the IRQ bus 422 for pulses 608 and 610, and may measure or time the durations 604, 606 of any detected pulses 608, 610. In one example, the bus master device 404 may include a timer or counter that is initiated upon detecting a transition 620, 622 at the beginning of the pulse 608, 610. The timer or counter value after the termination of the pulse 608, 610 may then be compared to the predefined durations associated with each group 406, 408.

In the example, the data control bus 402 may be idle during a first period of time 614, before a first pulse 608 is received. When a first IRQ signal is asserted on the shared single line IRQ bus 422, the bus master device 404 detects that the IRQ bus has been pulled low, and determines the period, width, or duration 604 of the pulse. For example, the bus master device 404 may determine that the duration 604 of the first pulse 608 is consistent with an interrupt request from a member of a first group of devices 406 upon termination of the first pulse 608. The bus master device 404 may initiate a scan 616 of the members of the first group of devices 406 to determine their IRQ status and identify which member or members of the first group 406 asserted the IRQ request 608. In one example, the bus master device 404 may transmit commands and/or requests on the control data bus 402 to each member of the first group 406 that cause the recipient of each request to respond with IRQ status. The bus master device 404 may exchange data, control and other information with the identified interrupting member of the first group 406.

A second interrupt request pulse 610 may be received at some point after the first interrupt request pulse 608. The second interrupt request pulse 610 may have a duration 606 that corresponds to a second group of slave devices 408. Upon receipt of the second interrupt request pulse 610, the bus master device 404 may detect, determine or calculate the pulse width, period, or duration 606. The bus master device 404 may then initiate a scan 618 of the members of the second group of devices 409 to determine their IRQ status, and to identify which member or members of the second group 408 asserted the IRQ request corresponding to the second pulse 610.

Figure 7:
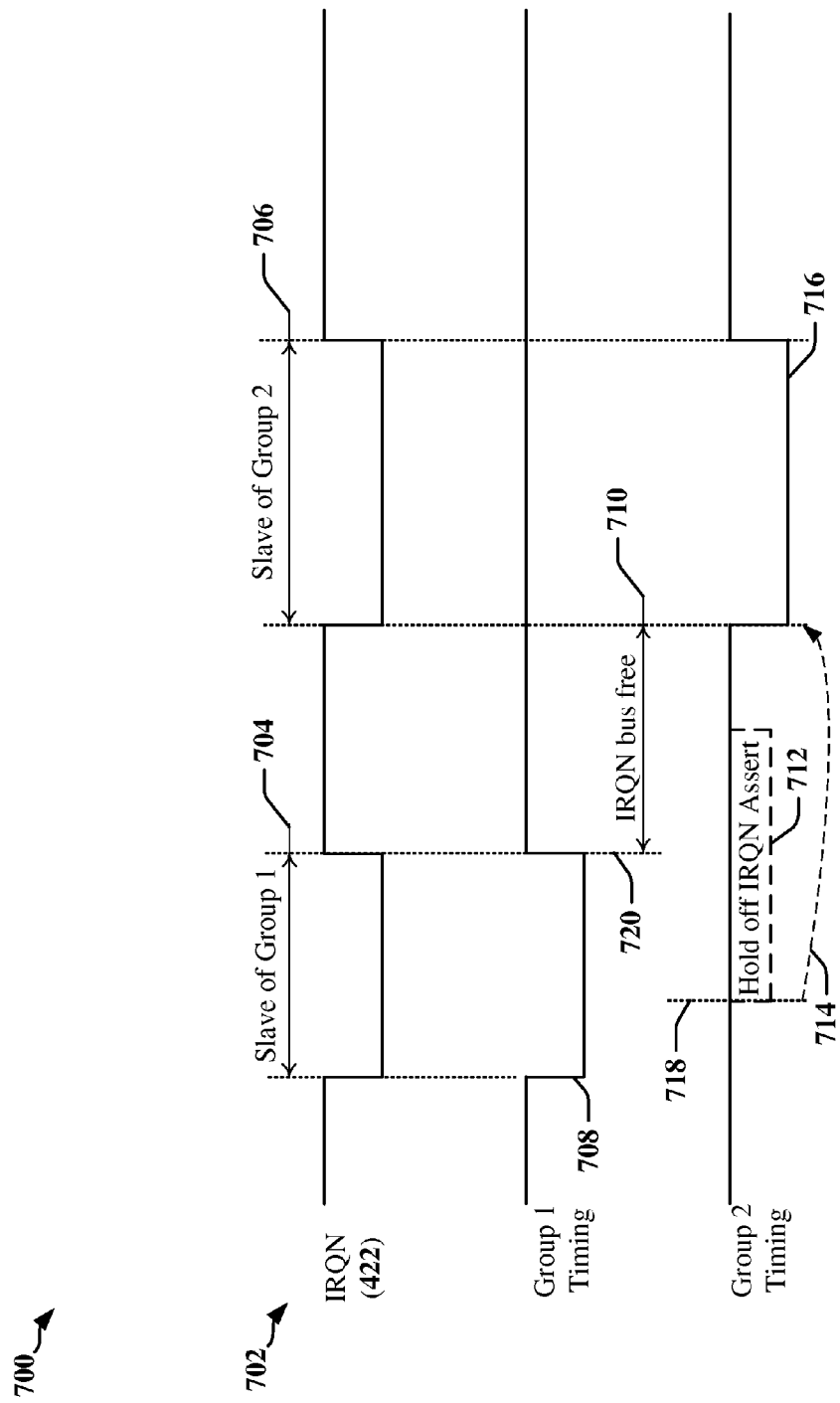
FIG. 7 illustrates a first technique that can avoid simultaneous assertions of IRQs on a shared single line IRQ bus according to certain aspects disclosed herein.

FIG. 7 is a timing diagram illustrating a method for avoiding the occurrence of simultaneous, overlapping, and/or conflicting interrupt requests according to certain aspects disclosed herein. In some instances, it may be desirable to avoid the occurrence of overlapping IRQ pulses that may lead to conflicting or contending interrupt requests. Conflicting interrupt requests may be avoided by configuring the slave devices to monitor the IRQ bus 422 prior to asserting an interrupt request. Interrupt requests 712 may be deferred 714 if another device has already asserted an interrupt request 708 on the shared single line IRQ bus 422.

In the depicted example, a first pulse 704 is asserted on the IRQ bus 422 by a slave device from the first group of devices 406. A second slave device may wish to assert an interrupt request during the duration 704 of the first pulse 708. According to one aspect, the second slave device may delay assertion of the interrupt request on the IRQ bus 422. At a time 718, the second slave device may decide to initiate an interrupt request. Upon checking the IRQ bus 422, the second slave device may determine that a pulse 708 has been asserted on the IRQ bus 422 by another slave device. Accordingly, the second device may initiate a hold-off or delay period 712 to allow the IRQ bus 422 to return to an idle state. The hold-off period 712 may have a predefined duration, a duration that includes a minimum back-off period and/or a random delay, or a period that terminates a predefined time after the IRQ bus 422 returns to an idle state. The second slave device may be precluded from asserting an interrupt request for a minimum period of time 710 during which the IRQ bus 422 is to be free or idled. The IRQ bus free time period 710 may be measured from the point in time 720 at which the first pulse 708 on the IRQ bus 422 terminates and, for example, the IRQ bus 422 returns to a logic high state. The next interrupt request 716 may be asserted after the minimum bus free time 710 expires. Upon expiration of the minimum bus free time 710, the second slave device may assert an interrupt request by providing a pulse 716 on the IRQ bus 422. In the example, the second slave device is a member of the second group of slave devices 408, and the duration 706 of the second pulse 716 may be different from the duration 704 of the first pulse 708.

Figure 8:
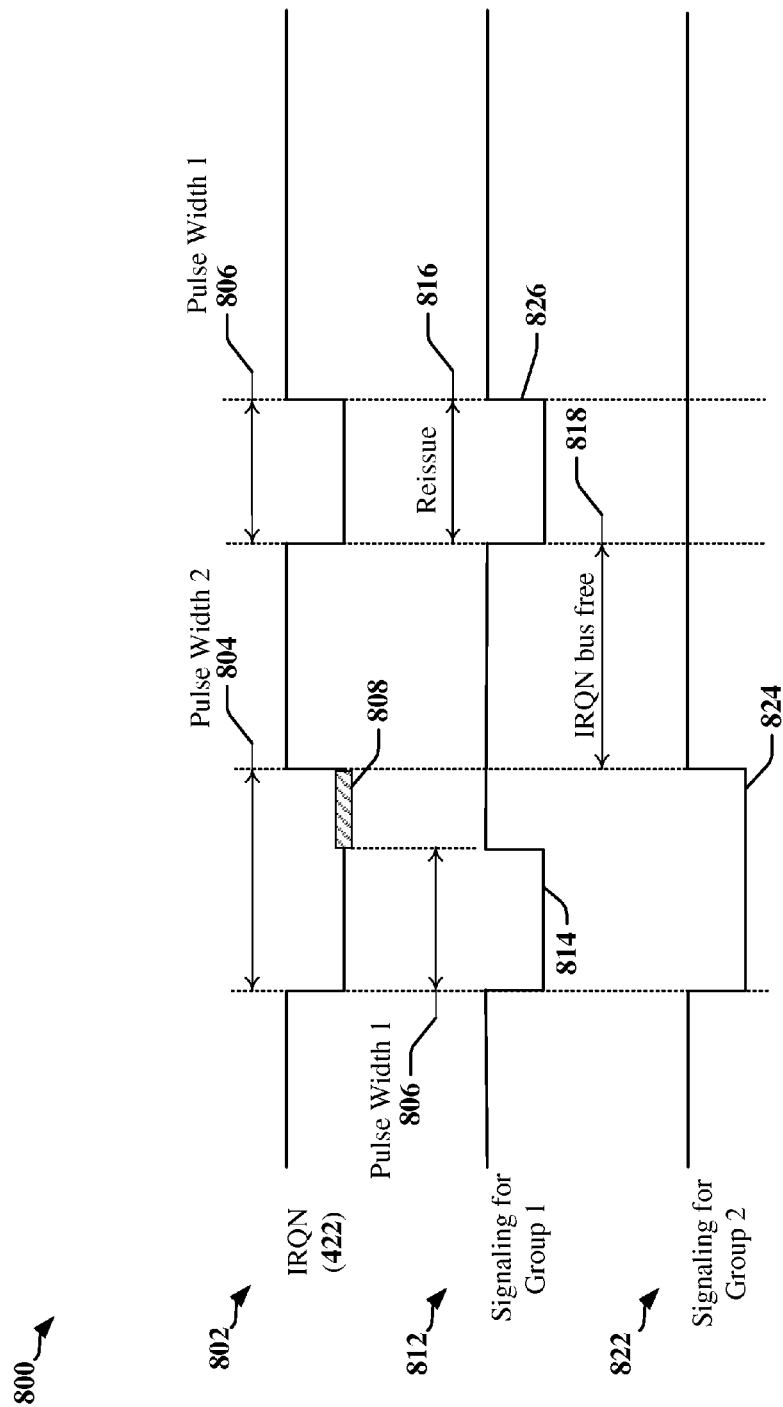
FIG. 8 illustrates a second technique that can handle simultaneous assertions of IRQs on a shared single line IRQ bus according to certain aspects disclosed herein.

FIG. 8 is a timing diagram 800 that illustrates the operation of a scheme that may be employed when simultaneous IRQ signals are supported by an I2C, CCI, and/or CCIe interface. The simultaneous IRQ signals may result in contentions and/or conflicts between individual slave devices and/or between slave devices in different groups 406, 408 that use a shared single IRQ bus 422. The timing of signals on the IRQ bus 422 is illustrated in a first timing chart 802, while the contributions by slave devices in the first and second groups 406, 408 are illustrated in second and third timing charts 812, 822, respectively. A first IRQ pulse 814 is asserted by a first slave device in the first group 406 at the same time or concurrently with a second IRQ pulse 824 asserted by a second slave device in a second group 408. The second IRQ pulse 824 may have a longer duration 804 than the duration of the first pulse 806. After the termination of the first pulse 814, the first slave device may recognize that a higher priority device has asserted an interrupt request because of the presence of a portion 808 of the second pulse 824 on the IRQ bus 422. The first slave device may recognize this condition 808 of the IRQ bus 422 as an effective collision, contention or conflict by monitoring the IRQ bus 422 after termination of the first pulse 814. The first device may then determine that the second slave device has a higher priority and may defer a renewed request until after the IRQ bus free period 818, which commences after termination of the second pulse 824. The bus master device 404 may detect the duration of the second pulse 824 and address the second group 408 of devices to identify and service the source of the interrupt request. The bus master device 404 may not be aware of the first pulse 814.

The first slave device may reissue its interrupt request by providing a third pulse 826 on the IRQ bus 422 after expiration of the IRQ bus free period 818.

Figure 9:
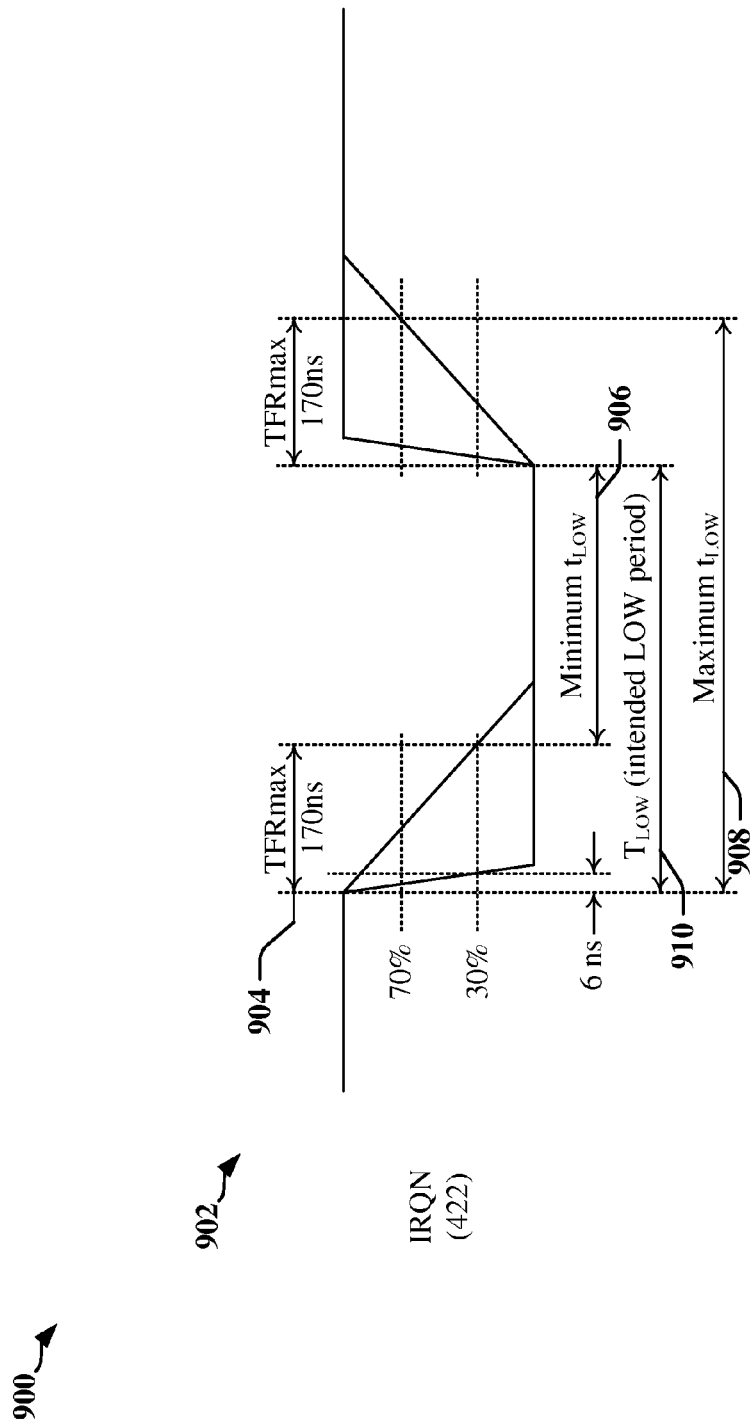
FIG. 9 illustrates timing associated with a shortest IRQ signal length.

FIG. 9 is a timing diagram 900 illustrating the timing tolerance related to an IRQ pulse, where the tolerances may be determinative of the minimum IRQ pulse width. In some instances, protocols governing signaling on the I2C, CCI, and/or CCIe interface may define a minimum value for the low duration ($t_{LOW}$) 906 to permit detection by an I2C, CCI, and/or CCIe master device 404, although for the purposes of this description it may be assumed that the low duration may not be subject to a specified minimum. The timing diagram 900 illustrates a single pulse 902.

In the example timing diagram 900, the minimum threshold voltage for detecting a "high" signaling state is at 70% of switching circuit supply voltage ("VDD") level and the maximum threshold voltage for detecting a "low" signaling state is 30% of VDD level. A receiver may determine either a high or low signaling state for a voltage level of the IRQ bus 422 that lies between 30% and 70% of VDD level, depending on receiver input levels. A maximum fall-rise time (TFRmax) 904 may be defined. The duration of TFRmax 904 may be determinative of the duration of a low period ($T_{LOW}$) 910 assigned to a slave device for asserting an interrupt request. The value of $T_{LOW}$ 910 may be selected to enable a master device 404 to distinguish between IRQ signals from different groups of slave devices. From the perspective of the master device 404, a low condition may be observed on the IRQ bus 422 if:

$TRFmax < T_{LOW}$.

In order to distinguish between groups 406, 408 of slave devices, different units of $T_{LOW}$ may be assigned as the IRQ pulse width for the groups 406, 408. In one example, a first group 406 may be assigned an IRQ pulse width of $T_{LOW}$, while a second group 408 may be assigned an IRQ pulse width of $2 \times T_{LOW}$. In this example, the low period observed by the bus master device 404 may be calculated as follows:

First group 406: $T_{LOW} - TFR < t_{LOW} < T_{LOW} + TFR$

Second group 406: $2T_{LOW} - TFR < t_{LOW} < 2T_{LOW} + TFR$.

Note that after a first slave device asserts IRQ signal low, a second slave device may not detect IRQ signal low for a period of time extending TFRmax to $t_{LOWmin}$, which must be at least TFRmax in duration. Therefore, TLOW>3TFR max, and tLOW min>2TFRmax. Accordingly, a minimum value for $t_{LOW}$ 906 may be calculated as follows:

$$2T_{LOW}-TFR>T_{LOW}+$$
$$TFR \rightarrow 2TFR\text{max} < T_{LOW} \rightarrow 3TFR\text{max} < T_{LOW}$$
$$\rightleftarrows 2TFR\text{max} < t_{LOWmin}$$

Examples of Apparatus, Systems and Methods Involving a Common IRQ Bus

Figure 10:
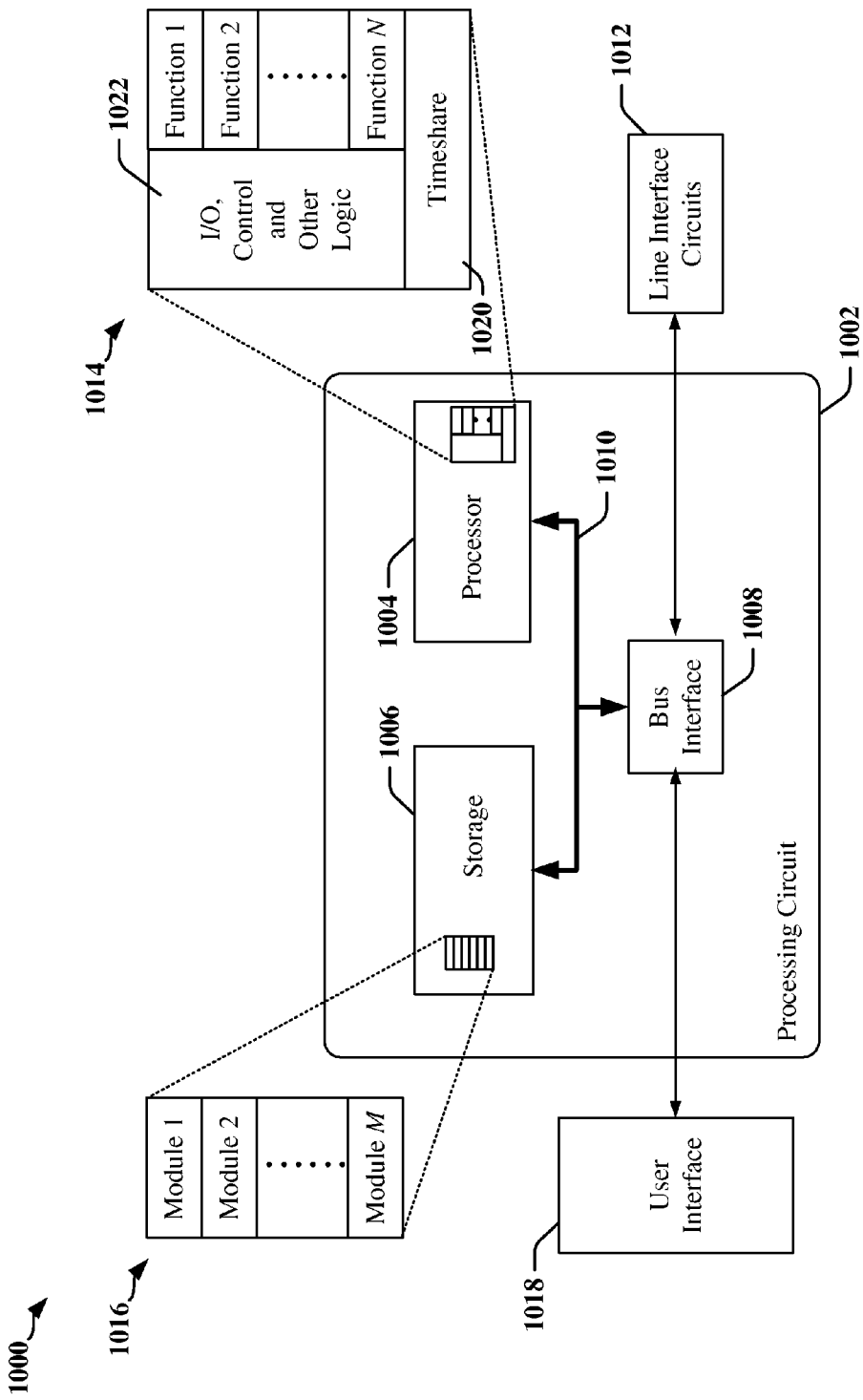
FIG. 10 is a block diagram illustrating an example of an apparatus employing a processing circuit that may be adapted according to certain aspects disclosed herein.

FIG. 10 is a conceptual diagram 1000 illustrating a simplified example of a hardware implementation for an apparatus employing a processing circuit 1002 that may be configured to perform one or more functions disclosed herein. In accordance with various aspects of the disclosure, an element, or any portion of an element, or any combination of elements as disclosed herein for managing or initiating interrupts using a common IRQ bus may be implemented using the processing circuit 1002. The processing circuit 1002 may include one or more processors 1004 that are controlled by some combination of hardware and software modules. Examples of processors 1004 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1004 may include specialized processors that perform specific functions, and that may be configured, augmented or controlled by one of the software modules 1016. For example, the processing circuit may be configured as a communications processor or another type of processor that may be adapted to handle encoding and decoding of data for transmission on one or more wireless networks. The one or more processors 1004 may be configured through a combination of one or more software modules 1016 loaded during initialization, and may be further configured by loading or unloading one or more of the software modules 1016 during operation.

In the illustrated example, the processing circuit 1002 may be implemented with a bus architecture, represented generally by the bus 1010. The bus 1010 may include any number of interconnecting buses and bridges depending on the specific application of the processing circuit 1002 and the overall design constraints. The bus 1010 links together various circuits including the one or more processors 1004, and storage 1006. Storage 1006 may include memory devices and mass storage devices, and may be referred to herein as computer-readable media. The bus 1010 may also link various other circuits such as timing sources, timers, peripherals, voltage regulators, and power management circuits. A bus interface 1008 may provide an interface between the bus 1010 and one or more transceivers or line interface circuit 1012. A line interface circuit 1012 may include differential line drivers and receivers, a CDR, encoders and decoders that are used in communicating with various other apparatus over a transmission medium that may include a multi-wire serial bus. Depending upon the nature of the apparatus, a user interface 1018 (e.g., keypad, display, speaker, microphone, joystick) may also be provided, and may be communicatively coupled to the bus 1010 directly or through a bus interface 1008.

A processor 1004 may be responsible for managing the bus 1010 and/or for general processing that may include the execution of software stored in a computer-readable medium that may include the storage 1006. In this respect, the processing circuit 1002, including the processor 1004, may be used to implement any of the methods, functions and techniques disclosed herein. The storage 1006 may be used for storing data that is manipulated by the processor 1004 when executing software, and the software may be configured to implement any one of the methods disclosed herein.

One or more processors 1004 in the processing circuit 1002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1006 or in an external computer readable medium. The computer-readable medium and/or storage 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1006 may also include, by way of example, a carrier wave, a transmission line, and any other suitable medium for transmitting software and/or instructions that may be accessed and read by a computer. Computer-readable medium and/or the storage 1006 may reside in the processing circuit 1002, in the processor 1004, external to the processing circuit 1002, or be distributed across multiple entities including the processing circuit 1002. The computer-readable medium and/or storage 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1006 may maintain software maintained and/or organized in loadable code segments, modules, applications, programs, etc., which may be referred to herein as software modules 1016. Each of the software modules 1016 may include instructions and data that, when installed or loaded on the processing circuit 1002 and executed by the one or more processors 1004, contribute to a run-time image 1014 that controls the operation of the one or more processors 1004. When executed, certain instructions may cause the processing circuit 1002 to perform functions in accordance with certain methods, algorithms and processes described herein.

Some of the software modules 1016 may be loaded during initialization of the processing circuit 1002, and these software modules 1016 may configure the processing circuit 1002 to enable performance of the various functions disclosed herein. For example, some software modules 1016 may configure internal devices and/or logic circuits 1022 of the processor 1004, and may manage access to external devices such as the line interface circuits 1012, the bus interface 1008, the user interface 1018, timers, mathematical coprocessors, and so on. The software modules 1016 may include a control program and/or an operating system that interacts with interrupt handlers and device drivers, and that controls access to various resources provided by the processing circuit 1002. The resources may include memory, processing time, access to the line interface 1012, the user interface 1018, and so on.

One or more processors 1004 of the processing circuit 1002 may be multifunctional, whereby some of the software modules 1016 are loaded and configured to perform different functions or different instances of the same function. The one or more processors 1004 may additionally be adapted to manage background tasks initiated in response to inputs from the user interface 1018, the line interface circuits 1012, and device drivers, for example. To support the performance of multiple functions, the one or more processors 1004 may be configured to provide a multitasking environment, whereby each of a plurality of functions is implemented as a set of tasks serviced by the one or more processors 1004 as needed or desired. In one example, the multitasking environment may be implemented using a timesharing program 1020 that passes control of a processor 1004 between different tasks, whereby each task returns control of the one or more processors 1004 to the timesharing program 1020 upon completion of any outstanding operations and/or in response to an input such as an interrupt. When a task has control of the one or more processors 1004, the processing circuit is effectively specialized for the purposes addressed by the function associated with the controlling task. The timesharing program 1020 may include an operating system, a main loop that transfers control on a round-robin basis, a function that allocates control of the one or more processors 1004 in accordance with a prioritization of the functions, and/or an interrupt driven main loop that responds to external events by providing control of the one or more processors 1004 to a handling function.

Figure 11:
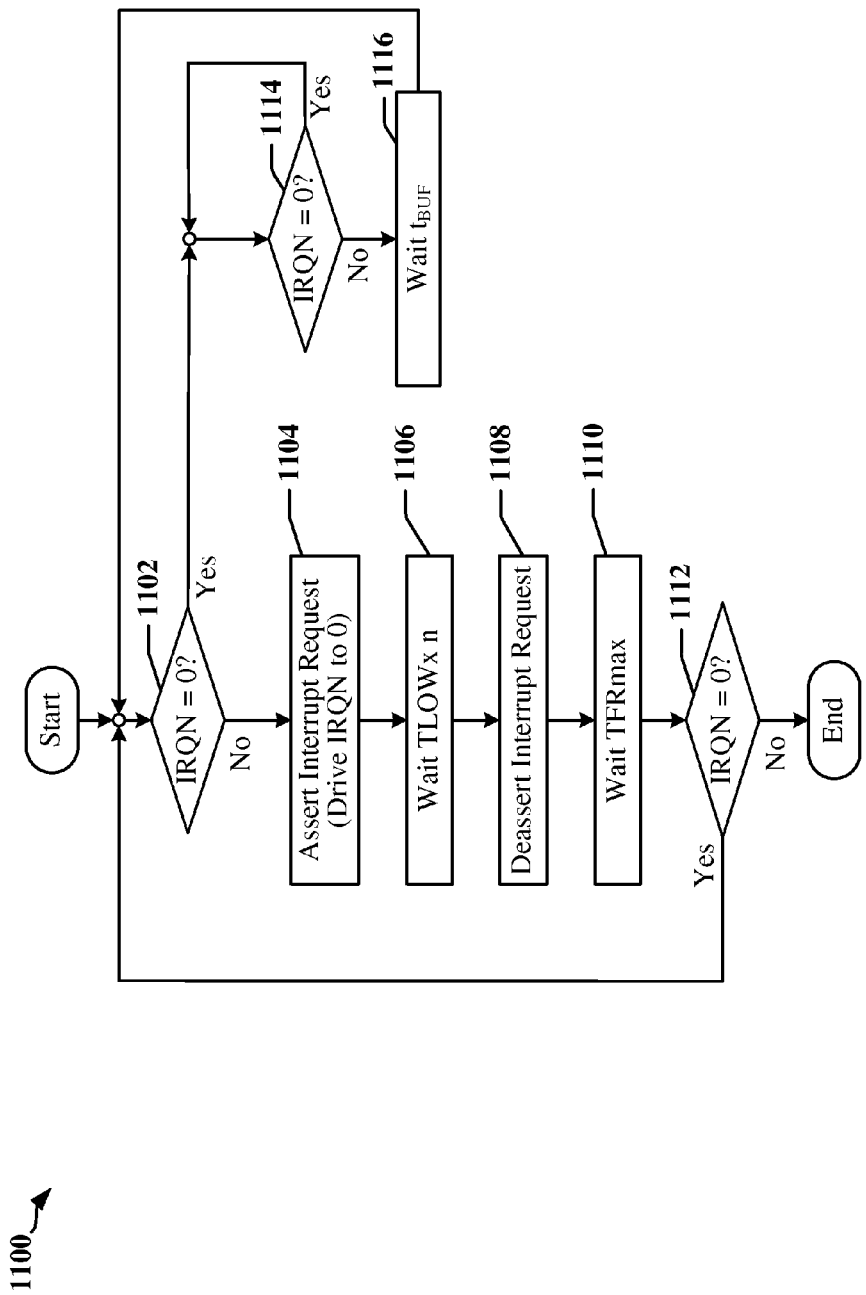
FIG. 11 is a flowchart of a first example of a method for asserting an IRQ on a shared IRQ bus according to certain aspects disclosed herein.

FIG. 11 is a flowchart 1100 illustrating a first example of a method for asserting an IRQ on a shared IRQ bus according to certain aspects disclosed herein. The method may be implemented by a slave device, for example. The slave device may determine a need to communicate over a control data bus and may initiate the method to communicate an interrupt request to a master device over a shared IRQ bus. At block 1102, the slave device may ascertain whether another device is signaling on the shared IRQ bus. For example, the IRQ bus may be in a logic low state when another device is signaling an IRQ. If the IRQ bus is low (IRQN=0), then the slave device may wait at block 1114 until the IRQ bus goes high. When the slave device determines at block 1102 that the IRQ bus is in a signaling state representative of a logic high, the slave device may assert its IRQ signal at block 1104 by driving the IRQ bus low. The slave device may then wait for a predefined IRQ signal time period at block 1106. The IRQ signal time period may have a duration that identifies the slave device and/or a group of slave devices. In one example, the IRQ signal time period may be defined in units of a minimum low time (TLOW). After the predefined IRQ signal time period has elapsed, the slave device may desassert its IRQ signal at block 1108. In some instances, the slave device may monitor the IRQ bus after another predefined period of time (TFRmax) at block 1110. The slave device may monitor the IRQ bus at block 1112 to ascertain whether the IRQ bus remains in a signaling state representative of a logic low (i.e., IRQN=0). If the signaling state of the IRQ bus remains at logic low, then another slave device may have asserted its IRQ signal and the slave device may repeat the process to reissue its IRQ signal beginning at block 1102. If the signaling state of the IRQ bus has returned to a logic high signaling state, the process ends and the slave device may anticipate commands or requests from the bus master device.

Figure 12:
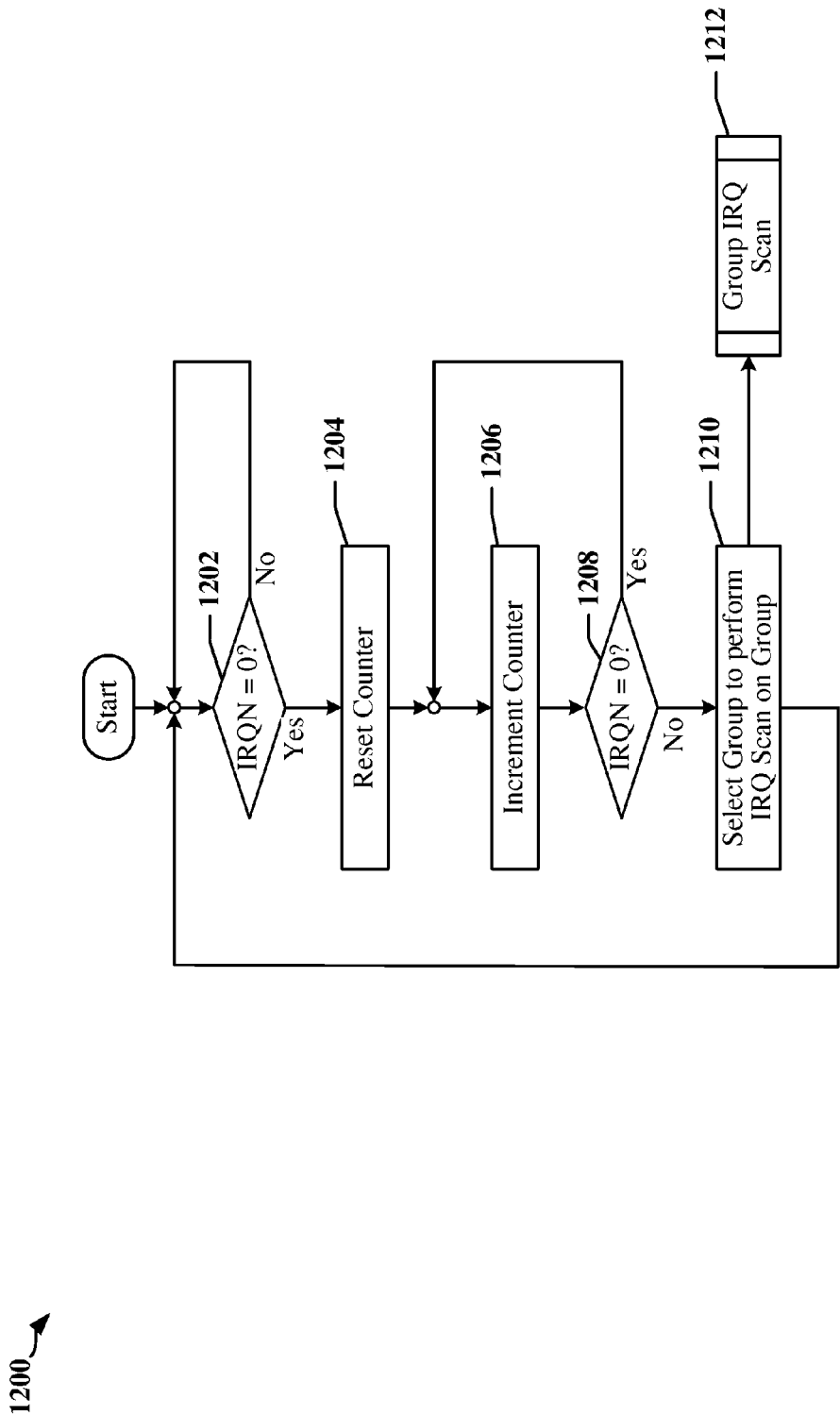
FIG. 12 is a flowchart of a first example of a method for handling IRQs on a shared IRQ bus according to certain aspects disclosed herein.
Figure 13:
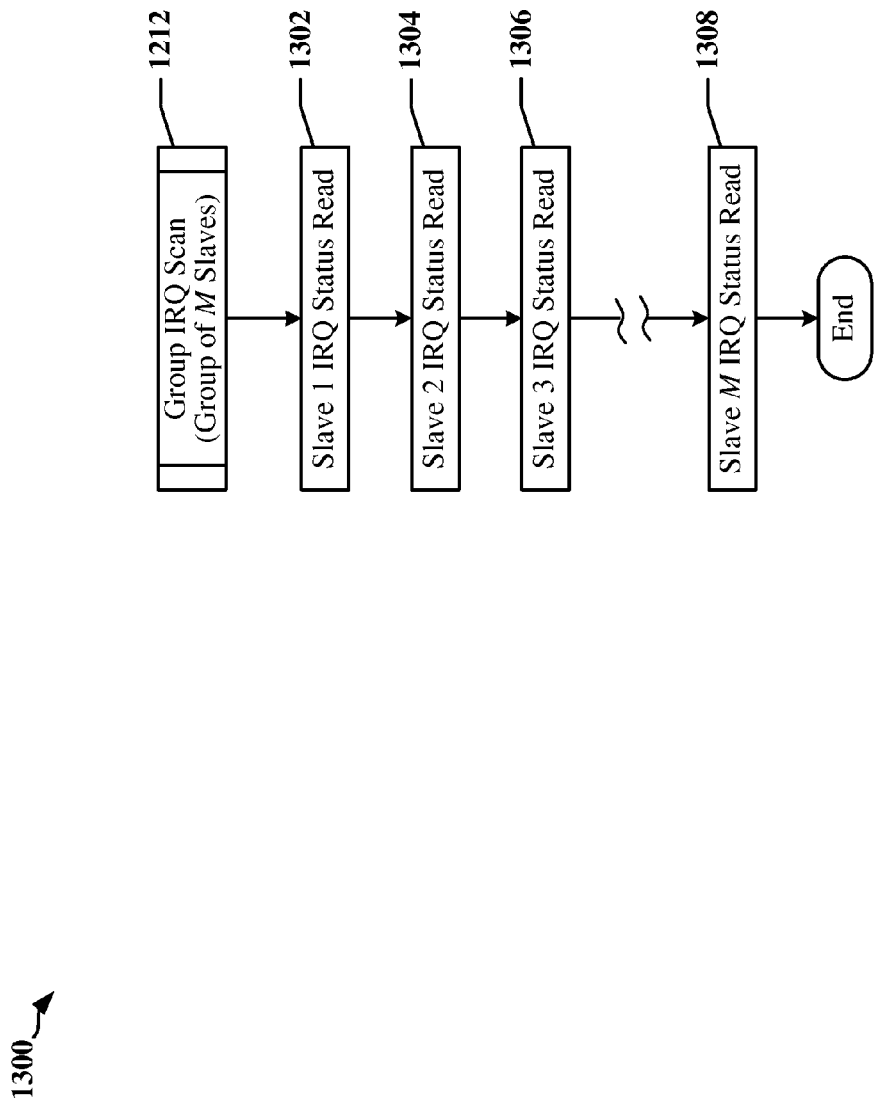
FIG. 13 is a flowchart of a method for scanning a group of slave devices to identify a device that asserted an IRQ on a shared IRQ bus according to certain aspects disclosed herein.

FIG. 12 is a flowchart 1200 illustrating a first example of a method for handling IRQs on a shared IRQ bus according to certain aspects disclosed herein. The method may be implemented by a master device, for example. The master device may ascertain the identity of a group of devices which includes a slave device that has asserted an IRQ signal on a shared single line IRQ bus. The master device may ascertain whether an IRQ signal has been asserted on the shared single line IRQ bus at block 1202. The IRQ signal may be asserted by driving the shared single line IRQ bus low, for example. When the shared single line IRQ bus has been asserted, the master device may reset a counter at block 1204. The master device may then increment the counter at block 1206 while checking if the IRQ bus is still asserted at block 1208. This counter permits the master device to ascertain the length/period of the IRQ signal (e.g., pulse width). Once the IRQ bus is deasserted, the master device may select a group at block 1210 to which the slave device belongs based on the IRQ signal length/period. The master device may continue to monitor the shared single line IRQ bus for further interrupt requests. The master device may additionally initiate a scan and/or query of the slave devices in that group at block 1212 (as illustrated in FIG. 13, for example) to identify the asserting slave device. The group IRQ scan 1212 may be performed independently, such that the master device may continue to monitor the shared single line IRQ bus for further interrupt requests while performing the group IRQ scan 1212. In some instances, the master device may differentiate between IRQ signals using other characteristics, including voltage levels, for example.

FIG. 13 is a flowchart 1300 illustrating an example of a method for performing a group IRQ scan to identify a slave device after an IRQ signal is asserted on a shared single line IRQ bus. The method may perform the functions identified in block 1212 illustrated in FIG. 12. The group IRQ scan may include querying each slave device in a group for its respective status register at blocks 1302, 1304, 1306, 1308. The response to the queries may enable the master device to ascertain which slave device in a group has asserted the IRQ signal. Once identified, the master device may grant the asserting slave device use of a control data bus.

Figure 14:
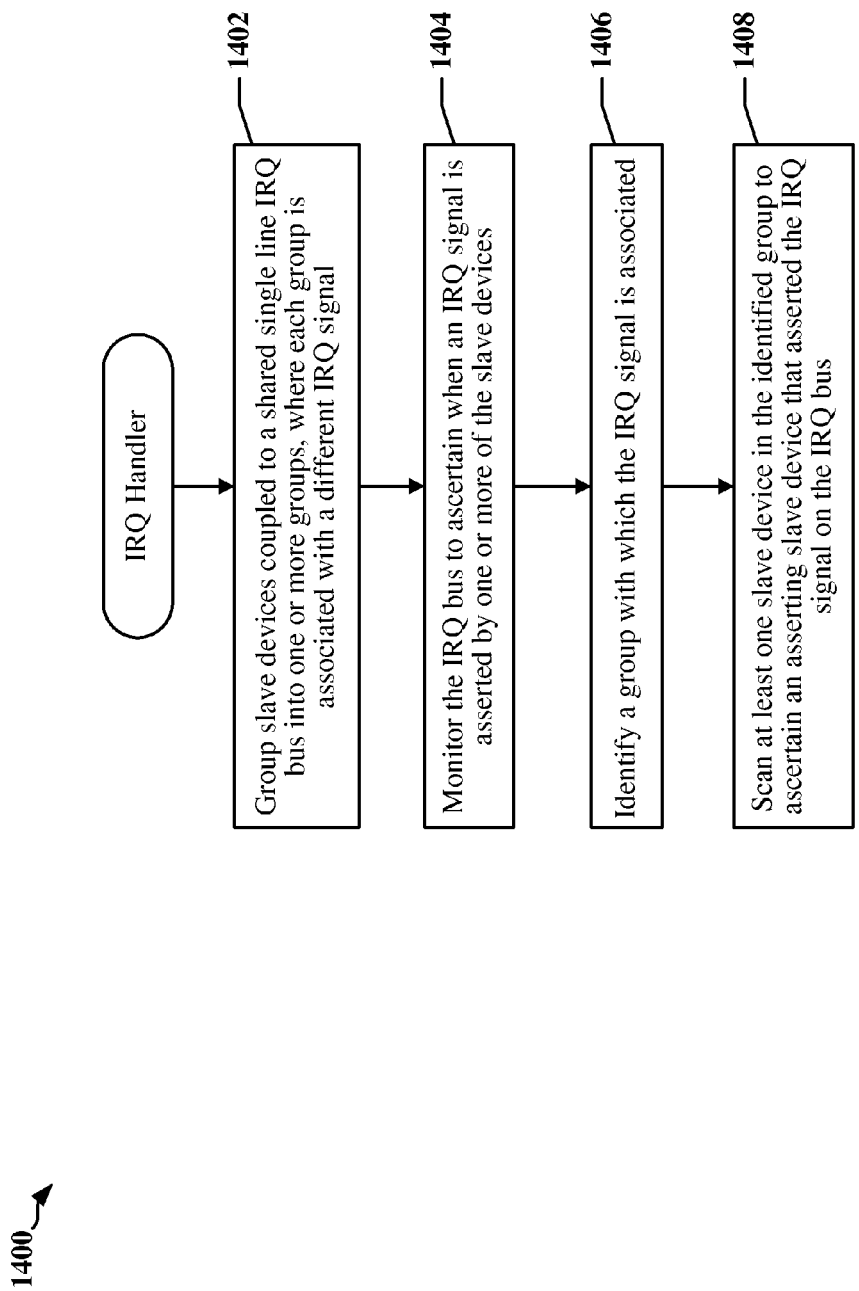
FIG. 14 is a flow chart of a second example of a method for handling IRQs on a shared IRQ bus according to certain aspects disclosed herein.

FIG. 14 is a flow chart 1400 illustrating a second example of a method for handling IRQs on a shared IRQ bus according to certain aspects disclosed herein. The method may relate to the handling of interrupt requests communicated through a single line IRQ bus that may be shared by a plurality of slave devices. The single line IRQ bus may operate asynchronously. The single line IRQ bus may be dedicated to unidirectional signal transmissions from the slave devices to the master device. The method may be performed by a processing circuit of a device adapted to function as a master device on an I2C, CCI or CCIe bus.

At block 1402, the master device may group slave devices coupled to the shared single line IRQ bus into one or more groups. Each group may be associated with a different IRQ signal. The IRQ signal associated with each group may have a different pulse width than other IRQ signals associated with other groups.

At block 1404, the master device may monitor the IRQ bus to ascertain when an IRQ signal is asserted by one or more of the slave devices.

At block 1406, the master device may identify a group with which the IRQ signal is associated.

At block 1408, the master device may scan the slave devices of the identified group to determine or ascertain an asserting slave device that asserted the IRQ signal on the IRQ bus. Scanning a slave device in the identified group of slave devices may include scanning an IRQ status register of the slave device. The asserting slave device may receive further attention from the master device after the IRQ status register of the asserting slave device has been scanned. In one example, the master device may grant the asserting slave device access to transmit data over the control data bus.

In one aspect, the master device may support a first interface to the single line IRQ bus and a second interface to a control data bus to which the one or more slave devices are also coupled. The control data bus may support bidirectional signaling between the slave devices and the master device. At least one of the plurality of groups may include at least two slave devices.

Figure 15:
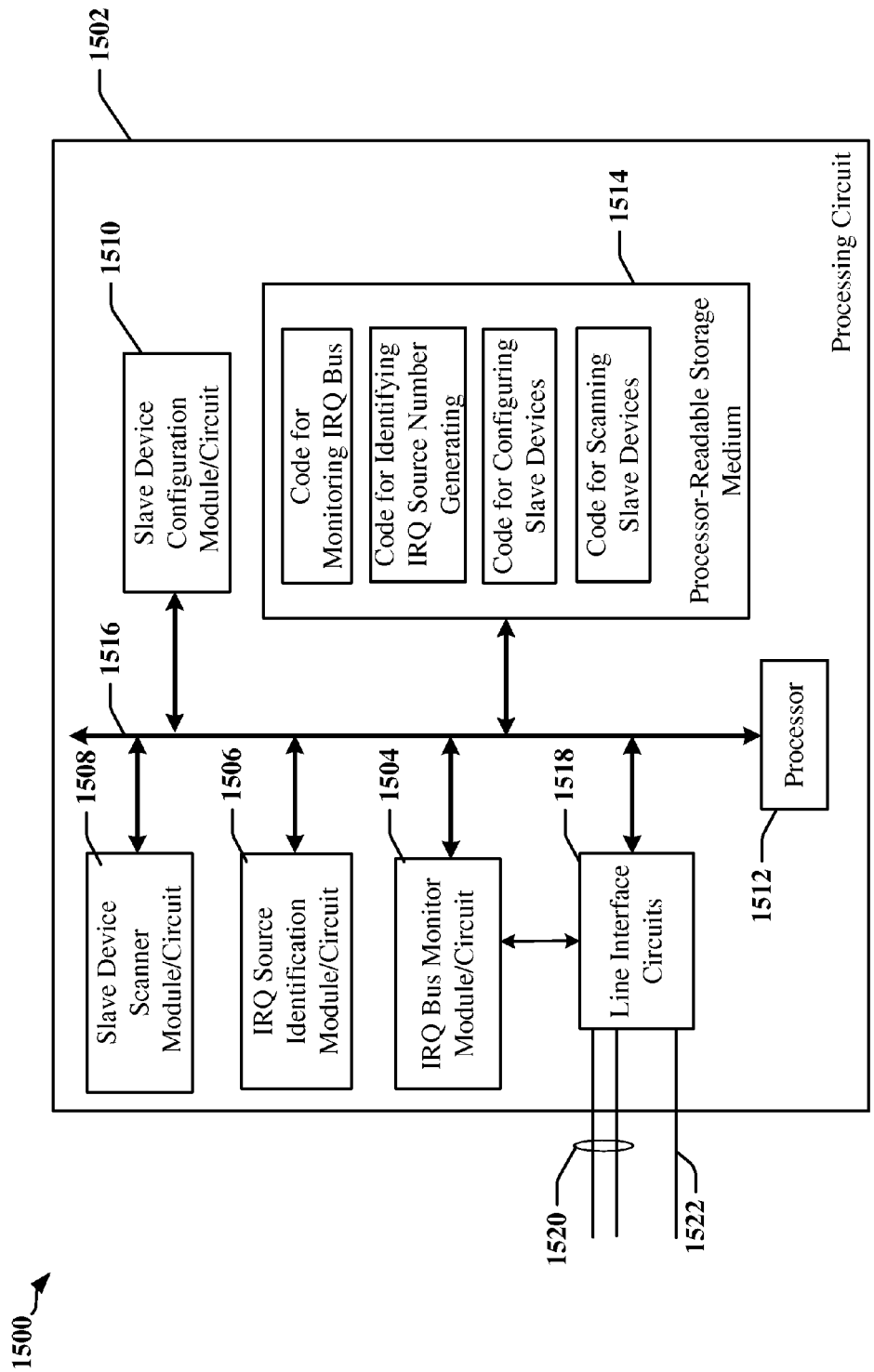
FIG. 15 is a diagram illustrating an example of a hardware implementation for an apparatus adapted for handling IRQs on a shared IRQ bus.

FIG. 15 is a conceptual diagram illustrating an example of a hardware implementation for an apparatus 1500 employing a processing circuit 1502. In this example, the processing circuit 1502 may be implemented with a bus architecture, represented generally by the bus 1516. The bus 1516 may include any number of interconnecting buses and bridges depending on the specific application of the processing circuit 1502 and the overall design constraints. The bus 1516 links together various circuits including one or more processors, represented generally by the processor 1512, and computer-readable media, represented generally by the processor-readable storage medium 1514. One or more timers may be connected to the bus and/or may be directly accessible or embodied in a processor 1512. The bus 1516 may also link various other circuits such as timing sources, timers, peripherals, voltage regulators, and power management circuits. Line interface circuits 1512 may include differential drivers and receivers that couple the processing circuit 1502 to a control data bus and/or circuits that couple the processing circuit to an IRQ bus. Depending upon the nature of the apparatus, a user interface may be provided to support devices such as a keypad, a display, a speaker, a microphone, a joystick, and the like.

The processor 1512 is responsible for managing the bus 1516 and general processing, including the execution of software stored on the processor-readable storage medium 1514. The software, when executed by the processor 1512, causes the processing circuit 1502 to perform the various functions described supra for any particular apparatus. The processor-readable storage medium 1514 may be used for storing data that is manipulated by the processor 1512 when executing software. The processor-readable storage medium 1514 may also be used for storing system information related to one or more remotely managed devices (e.g. profiles), and the apparatus 1500 itself.

In one configuration the processing circuit 1502 may perform one or more functions of a device adapted for communicating as a bus master on an I2C, CCI, and/or CCIe bus. The processing circuit 1502 may connected through a first one of the interface circuits 1518 to a single line IRQ bus 1522 to which one or more slave devices are coupled, and through a second of the interface circuits 1518 to a control data bus 1520 to which the one or more slave devices are also coupled. The processing circuit 1502 may include a module or circuit 1510 configured to group the slave devices into one or more groups, a module or circuit 1504 configured to monitor the IRQ bus to ascertain when an IRQ signal is asserted by at least one slave device, a module or circuit 1506 configured to identify a group with which the IRQ signal is associated, and a module or circuit 1508 configured to scan the slave devices of the identified group to ascertain an asserting slave device which asserted the IRQ signal on the IRQ bus. Each group may be associated with a different IRQ signal. In one example, the IRQ signals may be differentiated by duration of a pulse on the IRQ signals.

Figure 16:
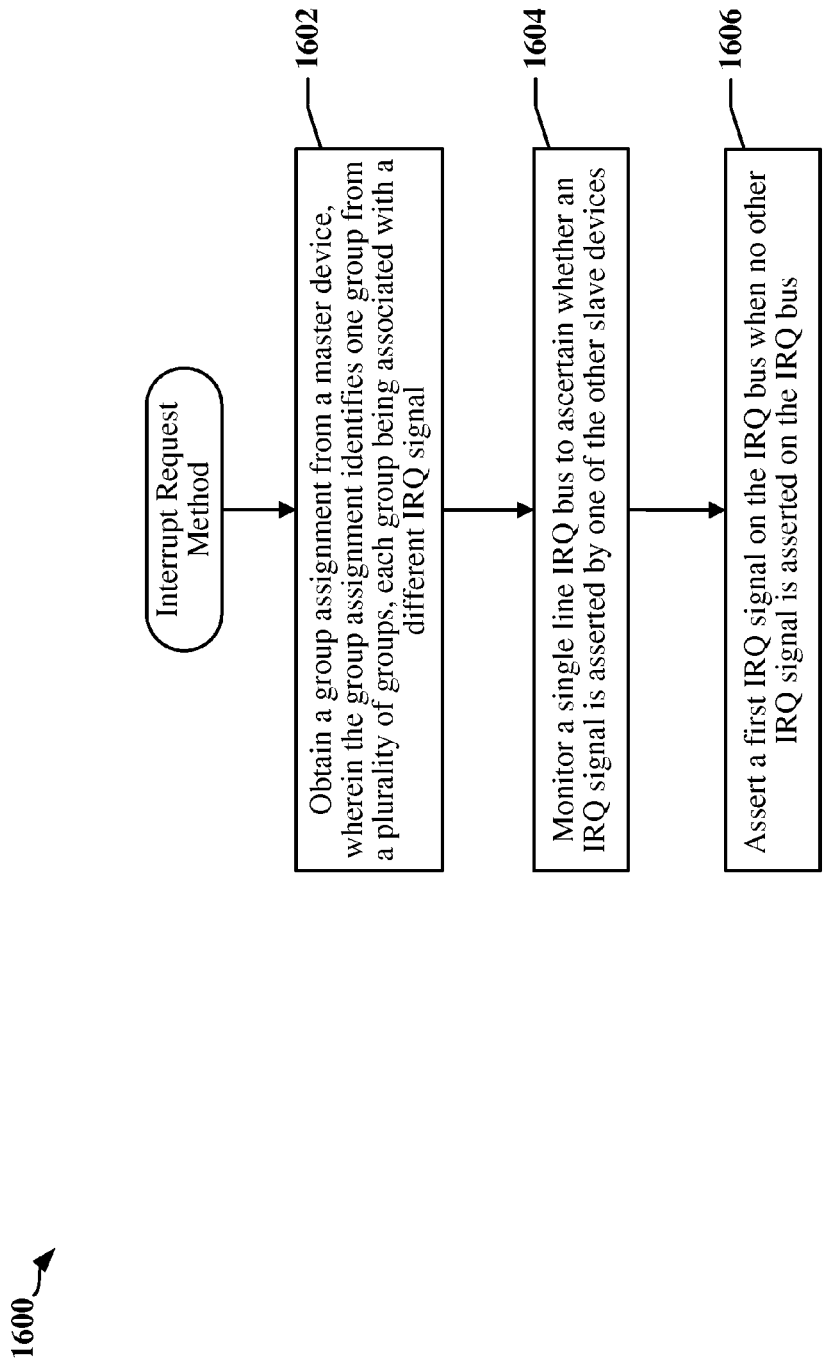
FIG. 16 is a flow chart of a second example of a method for asserting IRQs on a shared IRQ bus according to certain aspects disclosed herein.

FIG. 16 is a flow chart 1600 illustrating a second example of a method for asserting IRQs on a shared IRQ bus according to certain aspects disclosed herein. The method may relate to or facilitate requesting interrupts through a single line IRQ bus that is shared by a plurality of slave devices according to certain aspects disclosed herein. The single line IRQ bus may operate asynchronously. The single line IRQ bus may be dedicated to unidirectional signal transmissions from the slave devices to the master device. The method may be performed by a processing circuit of a device adapted to function as a slave device on an I2C, CCI or CCIe bus.

At block 1602, the slave device may obtain a group assignment from a master device. The group assignment may identify one group from a plurality of groups. Each group may be associated with a different IRQ signal. Each group includes at least one slave device.

At block 1604, the slave device may monitor the IRQ bus to ascertain when an IRQ signal is asserted by one of the other slave devices.

At block 1606, the slave device may assert an IRQ signal on the IRQ bus when no other IRQ signal is asserted on the IRQ bus.

In an aspect, the slave device may deassert the IRQ signal from the IRQ bus, and monitor the IRQ bus to ascertain whether another device is asserting a signal on the IRQ bus. If the other device is asserting the signal, the slave device may reassert the IRQ signal after the IRQ bus becomes idle.

In an aspect, the slave device may receive a status register query from the master device via the control data bus, and respond with a status indication that the slave device asserted the IRQ signal on the IRQ bus.

In an aspect, the slave device may be coupled to a control data bus. The control data bus may be compatible with I2C, CCI, and/or CCIe protocols and/or signaling. The control data bus may operate in a bidirectional manner between the slave devices and the master device.

Figure 17:
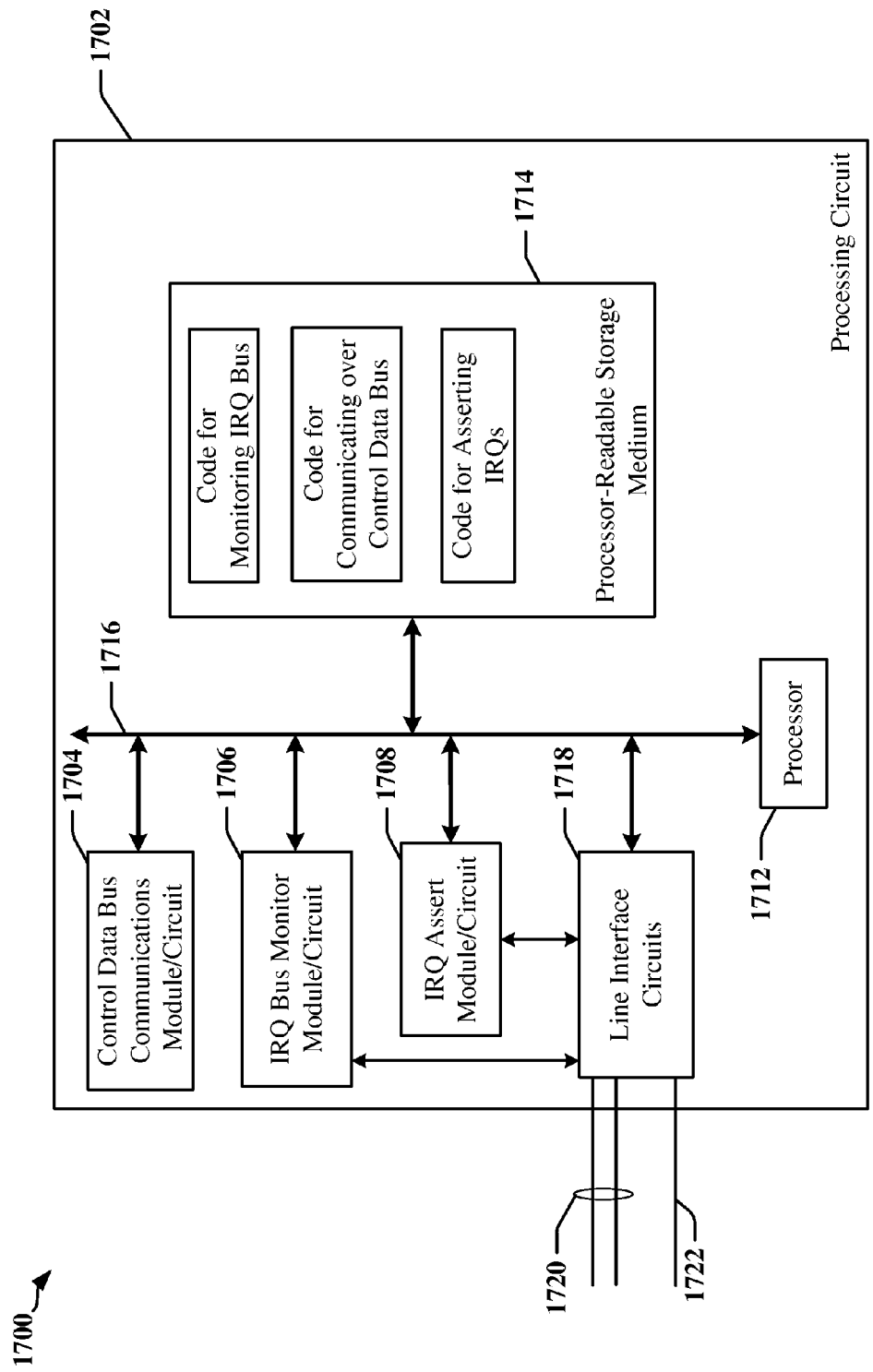
FIG. 17 is a diagram illustrating an example of a hardware implementation for an apparatus adapted to assert IRQs on a shared IRQ bus.

FIG. 17 is a conceptual diagram illustrating an example of a hardware implementation for an apparatus 1700 employing a processing circuit 1702 adapted to assert IRQs on a shared IRQ bus. In this example, the processing circuit 1702 may be implemented with a bus architecture, represented generally by the bus 1716. The bus 1716 may include any number of interconnecting buses and bridges depending on the specific application of the processing circuit 1702 and the overall design constraints. The bus 1716 links together various circuits including one or more processors, represented generally by the processor 1712, and computer-readable media, represented generally by the processor-readable storage medium 1714. One or more timers may be connected to the bus and/or may be directly accessible or embodied in a processor 1712. The bus 1716 may also link various other circuits such as timing sources, timers, peripherals, voltage regulators, and power management circuits. Line interface circuits 1712 may include differential drivers and receivers that couple the processing circuit 1702 to a control data bus and/or circuits that couple the processing circuit to an IRQ bus. Depending upon the nature of the apparatus, a user interface may be provided to support devices such as a keypad, a display, a speaker, a microphone, a joystick, and the like.

The processor 1712 is responsible for managing the bus 1716 and general processing, including the execution of software stored on the processor-readable storage medium

1714. The software, when executed by the processor 1712, causes the processing circuit 1702 to perform the various functions described supra for any particular apparatus. The processor-readable storage medium 1714 may be used for storing data that is manipulated by the processor 1712 when executing software. The processor-readable storage medium 1714 may also be used for storing system information related to one or more remotely managed devices (e.g. profiles), and the apparatus 1700 itself.

In one configuration the processing circuit 1702 may perform one or more functions of a device adapted for communicating as a bus slave on an I2C, CCI, and/or CCIe bus 1720. The processing circuit 1702 may connect through a first one of the interface circuits 1718 to a single line IRQ bus 1722 to which a bus master and one or more slave devices are coupled, and through a second of the interface circuits 1718 to a control data bus 1720 to which the bus master and the one or more slave devices are also coupled. The processing circuit 1702 may include a module or circuit 1704 configured to obtain a group assignment from a master device, a module or circuit 1706 configured to monitor the IRQ bus to ascertain when an IRQ signal is asserted by one of the other slave devices, and a module or circuit 1708 configured to assert an IRQ signal on the IRQ bus when no other IRQ signal is asserted on the IRQ bus. The group assignment may identify one group from a plurality of groups. Each group may be associated with a different IRQ signal.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A master device, comprising:
    a first interface to a single line interrupt request (IRQ) bus to which one or more slave devices are coupled;
    a second interface to a control data bus to which the one or more slave devices are also coupled; and
    a processing circuit coupled to the first interface and the second interface, the processing circuit adapted to:
        group the one or more slave devices into one or more groups, where each group is associated with a different IRQ signal;
        monitor the IRQ bus to ascertain when an IRQ signal is asserted by at least one slave device;
        when two or more slave devices have asserted the IRQ signal concurrently on a same wire, select for interrupt service a group with which the at least one of the two or more devices is associated based on duration of assertion of the IRQ signal; and
        scan the slave devices of the identified group to ascertain an asserting slave device which asserted the IRQ signal on the IRQ bus, wherein each of the slave devices is configured to unilaterally drive the IRQ bus asynchronously with respect to the master device.

2. The device of claim 1, wherein the processing circuit is further adapted to:
    grant the asserting slave device access to transmit data over the control data bus.

3. The device of claim 1, wherein duration of assertion of the IRQ signal associated with a higher priority group is configured to have a longer pulse width than a pulse width configured for an IRQ signal associated with a lower priority group.

4. The device of claim 1, wherein the single line IRQ bus is an asynchronous bus.

5. The device of claim 1, wherein the single line IRQ bus is dedicated to unidirectional signal transmissions from the slave devices to the master device.

6. The device of claim 1, wherein the control data bus comprises an Inter-Integrated Circuit (I2C) serial bus, a camera control interface (CCI) serial bus, or CCI extension (CCIe) serial bus.

7. The device of claim 1, wherein the control data bus supports bidirectional signaling between the slave devices and the master device.

8. A method operational on a master device, comprising:
    grouping slave devices coupled to a shared single line interrupt request (IRQ) bus into one or more groups, where each group is associated with a different IRQ signal;
    monitoring the IRQ bus to ascertain when an IRQ signal is asserted by one or more of the slave devices;
    when two or more slave devices have asserted the IRQ signal concurrently on a same wire, selecting for interrupt service a group with which the at least one of the two or more devices is associated based on duration of assertion of the IRQ signal; and
    scanning at least one slave device in the identified group to ascertain an asserting slave device that asserted the IRQ signal on the IRQ bus, wherein each of the slave devices is configured to unilaterally drive the IRQ bus asynchronously with respect to the master device.

9. The method of claim 8, wherein scanning the at least one slave device comprises:
    scanning an IRQ status register of the asserting slave device.

10. The method of claim 8, further comprising:
    granting the asserting slave device access to transmit data over a control data bus.

11. The method of claim 10, wherein the control data bus supports a bidirectional signaling between the slave devices and the master device.

12. The method of claim 8, wherein duration of assertion of the IRQ signal associated with a higher priority group is configured to have a longer pulse width than a pulse width configured for an IRQ signal associated with a lower priority group.

13. The method of claim 8, wherein the IRQ bus operates asynchronously.

14. The method of claim 8, wherein the IRQ bus is dedicated to unidirectional signal transmissions from the slave devices to the master device.

15. The method of claim 8, wherein at least one of the one or more groups includes two or more slave devices.

16. A slave device, comprising:
a first interface to a single line interrupt request (IRQ) bus to which a master device is coupled, wherein the slave device is configured to unilaterally drive the IRQ bus asynchronously with respect to the master device;
a second interface to a control data bus to which the master device is also coupled; and
a processing circuit coupled to the first interface and the second interface, the processing circuit adapted to:
obtain a group assignment from a master device, wherein the group assignment identifies one group from a plurality of groups, each group being associated with a different IRQ signal;
monitor the IRQ bus to ascertain whether an IRQ signal is asserted by another slave device; and
assert a first IRQ signal on the IRQ bus when no other IRQ signal is asserted on the IRQ bus.

17. The slave device of claim 16, wherein the IRQ bus is dedicated to unidirectional signal transmissions from one or more slave devices to the master device.

18. The slave device of claim 16, wherein the control data supports bidirectional communications between one or more slave devices and the master device.

19. The slave device of claim 16, wherein the control data bus comprises an Inter-Integrated Circuit (I2C) serial bus, a camera control interface (CCI) serial bus, or CCI extension (CCIe) serial bus.

20. The slave device of claim 16, wherein at least one of the plurality of groups includes two or more slave devices.

21. The slave device of claim 16, wherein the processing circuit is further adapted to:
deassert the first IRQ signal from the IRQ bus;
monitor the IRQ bus to determine whether a second IRQ signal is asserted on the IRQ bus by another slave device; and
reassert the first IRQ signal if the second IRQ signal is asserted on the IRQ bus, wherein the first IRQ signal is reasserted after the IRQ bus becomes idle.

22. The slave device of claim 16, wherein the processing circuit is further adapted to:
receive a status register query from the master device via the control data bus; and
respond with a status indication that the slave device asserted the first IRQ signal on the IRQ bus.

23. A method operational on a slave device, comprising:
obtaining a group assignment from a master device, wherein the group assignment identifies one group from a plurality of groups, each group being associated with a different interrupt request (IRQ) signal;
monitoring a single line IRQ bus to ascertain whether an IRQ signal is asserted by a different slave device; and
asserting a first IRQ signal on the IRQ bus when no other IRQ signal is asserted on the IRQ bus, wherein the slave device is configured to unilaterally drive the IRQ bus asynchronously with respect to the master device.

24. The method of claim 23, wherein the IRQ bus is dedicated to unidirectional signal transmissions from slave devices to the master device.

25. The method of claim 23, wherein at least one of the plurality of groups includes two or more slave devices.

26. The method of claim 23, further comprising:
deasserting the first IRQ signal from the IRQ bus;
monitoring the IRQ bus to ascertain whether a second IRQ signal is asserted on the IRQ bus; and
reasserting the first IRQ signal if the second IRQ signal is asserted, wherein the first IRQ signal is reasserted after the second IRQ signal is deasserted.

27. The method of claim 23, further comprising:
receiving a status register query from the master device via a control data bus; and
responding with a status indication that the slave device asserted the first IRQ signal on the IRQ bus.

28. The method of claim 27, wherein the control data bus is a bidirectional bus between the slave devices and the master device.

29. A master device, comprising:
a first interface to a single line interrupt request (IRQ) bus to which one or more slave devices are coupled;
a second interface to a serial data bus to which the one or more slave devices are also coupled; and
a processing circuit coupled to the first interface and the second interface, the processing circuit adapted to:
group the one or more slave devices into one or more groups, where each group is associated with a different IRQ signal;
monitor the first interface to ascertain when an IRQ signal is asserted by at least one slave device;
identify a group with which the IRQ signal is associated; and
scan the slave devices of the identified group to ascertain an asserting slave device which asserted the IRQ signal on the IRQ bus, wherein each of the slave devices is configured to unilaterally drive the IRQ bus asynchronously with respect to the master device,
wherein each of the one or more slave devices coupled to the serial data bus is configured to assert the IRQ signal on the IRQ bus after confirming that the IRQ bus is idle.

30. A slave device, comprising:
a first interface to a single line interrupt request (IRQ) bus to which a master device is coupled, wherein the slave device is configured to unilaterally drive the IRQ bus asynchronously with respect to the master device;
a second interface to a serial data bus to which the master device is also coupled; and
a processing circuit coupled to the first interface and the second interface, the processing circuit adapted to:
determining a group assignment for the slave device, wherein the group assignment identifies one group from a plurality of groups, each group being associated with a different IRQ signal;
confirm that the IRQ bus is idle; and
assert a first IRQ signal after confirming that the IRQ bus is idle.

* * * * *